United States Patent
Nahum

(10) Patent No.: US 7,437,753 B2
(45) Date of Patent: Oct. 14, 2008

(54) STORAGE AREA NETWORK (SAN) SECURITY

(75) Inventor: Nelson Nahum, Haifa (IL)

(73) Assignee: LSI Technologies Israel Ltd., Nesher (IL)

( * ) Notice: Subject to any disclaimer, the term of this patent is extended or adjusted under 35 U.S.C. 154(b) by 767 days.

(21) Appl. No.: 10/469,727

(22) PCT Filed: Feb. 27, 2002

(86) PCT No.: PCT/IL02/00152

§ 371 (c)(1),
(2), (4) Date: Aug. 28, 2003

(87) PCT Pub. No.: WO02/071224

PCT Pub. Date: Sep. 12, 2002

(65) Prior Publication Data

US 2004/0078599 A1   Apr. 22, 2004

(51) Int. Cl.
*H04L 9/32*  (2006.01)
*G06F 17/30*  (2006.01)
*G06F 12/00*  (2006.01)

(52) U.S. Cl. ........................ 726/4; 726/1; 726/2; 726/3; 707/202; 709/223; 705/30; 705/34; 711/114; 711/156; 710/36

(58) Field of Classification Search .................. 726/1–4, 726/16, 26–27; 711/114, 156; 710/36; 705/30, 705/34; 707/202; 709/223
See application file for complete search history.

(56) References Cited

U.S. PATENT DOCUMENTS 5,515,376 A  *  5/1996  Murthy et al. ............... 370/402

(Continued)

FOREIGN PATENT DOCUMENTS

EP         0 0989 490 A2    3/2000

(Continued)

OTHER PUBLICATIONS

Tom Clark, "Zoning for Fibre Channel Fabrics," White Paper Vixel Corporation, XX, XX, Aug. 31, 1999, pp. 1-7, XP002185194.

(Continued)

*Primary Examiner*—Ayaz Sheikh
*Assistant Examiner*—Trang Doan
(74) *Attorney, Agent, or Firm*—Frishauf, Holtz, Goodman & Chick, P.C.

(57) ABSTRACT

A method for the binary zoning of a Storage Area Network (SAN) for security is disclosed, for a SAN with physical devices consisting of a first array of hosts (1) and a second array of storage devices (4), and a SAN Switch (2, 2A) coupled intermediate the hosts and the storage devices. The SAN Switch routes I/O commands and accepts zoning commands. The method is based on starting operation of the SAN with mutually isolated physical devices and accepting zoning commands only after running security verification procedures requiring that hosts be authenticated and that storage devices be identified. Zoning is dynamically controlled from a workstation (8) operated by a System Administrator entering meta-zoning instructions which are used to automatically program the zoning of the SAN Switch for legitimate physical devices. The method is implemented for security and booting of a SAN.

34 Claims, 12 Drawing Sheets

U.S. PATENT DOCUMENTS

| | | | |
|---|---|---|---|
| 5,845,087 A * | 12/1998 | Trehus | 709/242 |
| 5,968,176 A | 10/1999 | Nessett et al. | |
| 6,182,226 B1 | 1/2001 | Reid et al. | |
| 6,195,366 B1 | 2/2001 | Kayashima et al. | |
| 6,343,324 B1 * | 1/2002 | Hubis et al. | 709/229 |
| 6,421,711 B1 * | 7/2002 | Blumenau et al. | 709/213 |
| 6,594,698 B1 * | 7/2003 | Chow et al. | 709/226 |
| 6,597,956 B1 * | 7/2003 | Aziz et al. | 700/3 |
| 6,697,924 B2 * | 2/2004 | Swank | 711/163 |
| 6,779,016 B1 * | 8/2004 | Aziz et al. | 709/201 |
| 6,799,255 B1 * | 9/2004 | Blumenau et al. | 711/152 |
| 6,839,747 B1 * | 1/2005 | Blumenau et al. | 709/223 |
| 7,055,173 B1 * | 5/2006 | Chaganty et al. | 726/11 |
| 7,103,653 B2 * | 9/2006 | Iwatani | 709/223 |
| 7,146,233 B2 * | 12/2006 | Aziz et al. | 700/101 |
| 7,281,044 B2 * | 10/2007 | Kagami et al. | 709/226 |
| 7,302,700 B2 * | 11/2007 | Mao et al. | 726/11 |

FOREIGN PATENT DOCUMENTS

| | | | |
|---|---|---|---|
| WO | WO 00/29954 A1 | | 5/2000 |
| WO | 00/55750 | * | 9/2000 |
| WO | WO 00/55750 A1 | | 9/2000 |
| WO | 00/55750 | * | 9/2002 |

OTHER PUBLICATIONS

Storage Networking Industry Association Fibre Channel Working Group, "A Common Interface for Host Bus Adapters," Storage Networking Industry Association—White Paper, Online!, Jan. 28, 2001, X002321879.

* cited by examiner

STORAGE AREA NETWORK (SAN) SECURITY

This application is a U.S. National Phase Application under 35 U.S.C. 371 of International Application PCT/IL02/00152, filed Feb. 27, 2002.

TECHNICAL FIELD

The present invention relates to the field of Storage Area Networks (SAN) in general and more particularly, to the security and booting of a SAN.

BACKGROUND ART

FIG. 1 is a block diagram of a prior art Storage Area Network (SAN), which comprises an array of host computers 1, or hosts 1 (H1, H2, ..., Hm) coupled via a SAN Switch 2, to an array of storage devices 4 (D1, D2, ..., Dn). In FIG. 1 the number of hosts 1 and of storage devices 4, is limited but sufficient for illustrative purposes. The hosts 1, the SAN Switch 2 and the storage devices 4 are coupled by Fibre Channel (FC) links 5, or storage network links 5, in a storage network 5', forming a SAN Fabric. A Fabric is a Fibre Channel Network. Users network links 6, pertaining to a user network 6', connect users 7, a System Administrator 8, and the SAN Switch 2, to the hosts 1. The user network is an Ethernet, such as a LAN, a WAN, or the Internet.

It is noted that the SAN Switch 2 is also known in the art as Fiber Channel Network Switch, or Fiber Channel Switch or Network Channel Switch. Storage devices also referred to as storage subsystems, neither being necessarily of the same kind. The term storage device relates to all kinds of storage in use with digital data, such as disks, tapes, etc.

The SAN Switch 2, which is operated for routing I/O communications between the array of hosts 1 and the array of storage devices 4, is also utilized for zoning functions, in an attempt to provide al least some measure of security. The array of hosts 1 and the array of storage devices 4 are related to as the physical devices of the SAN.

A zone is defined a group of physical devices sharing permission for mutual communication. Practically, zones are formed between ports residing in the SAN Switch 2, and coupled to the physical devices. The smallest possible zone is a group of at least one port linked to a host 1, or host port, and of at least one port pertaining to a storage device 4, or device port, to which the SAN Switch 2 grants permission for mutual communication. The number of ports may be even or odd, but never less than two, to always couple between at least one host 1 and at least one storage device 4. Ports belonging to different zones cannot communicate with each other, and therefore, physical devices belonging to different zones, are isolated from each other. When a host 1 has more than one Host Bus Adaptor, HBA, then a zone is defined as a group sharing permission for mutual communication between HBAs and storage devices. Again, the minimum for one zone is one HBA and one storage device 4.

The SAN Switch 2 is coupled to both the storage network 5', by links 5, and to the users network 6', by links 6. One of those users 7 is defined as a System Administrator (SA) manning a SA workstation 8 privileged with access to the SAN Switch 2 via the users network 6'. By operating his workstation 8, the System Administrator may manually define zones of ports coupled to physical devices. Once defined, those zones are set and remain static.

What the SA actually defines, is the zoning of ports connected to hosts 1 and to storage devices 4, each port having an identity number. The mere connection of a port number does not vouch for the identity of the physical device that is intended to be, or is actually, connected to that port.

It is recognized that the conventional zoning exercised by the SAN Switch 2 presents security loopholes. Modern SAN systems consist of arrays with numerous hosts 1, away and remote from the SAN, easing the disguise of a fake host 1 as a genuine computer. Even though the SAN Switch 2 is coupled directly to a host 1, the former is not equipped with means able to block a rogue host from joining the storage network 5' in disguise, by adopting a fake identity and posing as a legal host 1. Actually, the SAN Switch 2 recognizes a host 1 only by the port number, without any provisions for the detection of a false identity hiding behind that port number.

Sometimes, the SA uses the WWN (World Wide Name) of a HBA (Host Bus Adaptor) to identify a host 1. Each host 1 has at least one HBA, and each HBA is identified by the 8 bytes of its unique WWN number. However, there is nothing to certify that a given HBA with a WWN is really running in a host 1 legally coupled to the SAN. With computer crime on the increase, it is plausible to expect trials to couple a fake host 1 to a SAN. In view of the foregoing, it is therefore maintained that the security of the SAN Fabric is in danger and includes loopholes.

The connection of a large numbers of physical devices inevitably results in a huge number of ports, all ports being manually zoned by the SA. Almost certainly, the manually performed zoning of dozens of ports will lead to coupling mistakes. This practice, prone to human errors, creates another type of security flaws since although the System Administrator zones groups of specific physical devices together, one single mistaken coupling may add an uncalled for physical device into a zone.

For example, a mistake like connecting a storage device 4 to a wrong port in a SAN Switch 2 may cause data corruption. In other words, a storage device 4, intended for connection to a specific port may be mistakenly, or perhaps intentionally, coupled to a port other than the intended specific port. It should be noted that the SAN Switch 2 does not recognize a storage device 4 by identity, but only recognizes the physical ports, assuming that the intended storage device 4 is appropriately linked thereto. Again, a security problem may develop, especially if a connection is intentionally mistaken. These examples illustrate some typical security flaws of the zoning-function of the SAN Switch 2. There is thus a need to provide security measures to SAN networks, and to prevent unauthorized access due to either human error or criminal intentions. Such unauthorized access usually occurs at ports, because of a mistakenly made connection or of the coupling of an illegal physical device.

Consideration should also be given to the fact that a SAN is not a static facility with a frozen configuration, since hosts 1 and storage devices 4 are frequently added or deleted. An addition usually indicates an intentional expansion of resources, while a deletion may point to an accidental failure. Since a SAN Fabric is subject to instant configuration change, there is a need for dynamic security monitoring capabilities. Most of all, it is recognized that a tool is absent which might permit the remote dynamic management of the security of a SAN, under automatic control of a computer program.

Presently, there is an acute need for the provision of both data storage and data transfer security. This need is especially emphasized in view of the growing intricacy of systems as well as to the escalation of criminal activity.

SUMMARY

It is an object of the present invention to provide a method for securing and for booting a SAN according to binary zoning for implementing authentication and identification in default zoning when physical devices are isolated and for zoning according to meta zoning instructions for zoning only those physical devices verified as legitimate.

There is provided a method for a Storage Area Network (SAN) security with booting, and with physical devices having a first array of hosts (1) and a second array of storage devices (4), a storage network (5') with network links (5), and a users network (6') with users network links (6). A SAN Switch (2, 2A) is coupled intermediate the first array and the second array and to each physical device via network links and to the users network via a users network link. The SAN Switch routes I/O commands to the physical devices and is configured for accepting zoning commands defining zones for communication between at least one host and at least one storage device. The method operates binary zoning for security with default zoning and work zoning permitting the creation of, respectively, at least one default zone and at least one work zone. The binary zoning always first resides in default zoning, and the default zoning, mutually isolates each one of the physical devices, and runs a security procedure on each one of the physical devices for legitimacy verification, and in work zoning, zones only legitimate physical devices.

There is provided further a method for running, in default zoning of the security procedure and thereafter, creating, in work zoning, of at least one work zone comprising at least one legitimate host and at least one legitimate storage device. The method moreover provides running the security procedure that further comprises the steps of running an authentication procedure for presence and legitimacy verification of each one host out of the first array, and an identification procedure for presence and legitimacy verification of each one storage device out of the second array.

There is provided yet further a method for running continuously the security procedure for presence and legitimacy verification of the physical devices actually coupled in operation with the SAN, and rezoning in real time of the at least one work zone according to configuration changes associated with running the security procedure continuously.

There is provided yet further a method for securing a host with at least one HBA which is identified by a first WWN (World Wide Number), and a storage device comprises at least one LU (Logical Unit), and identified by a second WWN and by at least one LUN (Logical Unit Number). The security procedure authenticates each one host out of the first array independently of the first WWN, and identifies each one storage device out of the second array by the second WWN and by the at least one LUN.

There is provided additionally a method for a System Administration (SA) workstation coupled to the users network and to the SAN Switch. The SA workstation is configured for managing, securing and booting the SAN, and for entering meta-zoning instructions via the SA workstation. The meta-zoning instructions define programming commands for automatically deriving default zoning and work zoning, and programming automatically the SAN Switch, according to the meta-zoning instructions, into default zones and work zones.

There is provided further a method for controlling dynamically the binary zoning of the SAN Switch by entering meta-zoning instructions via the SA workstation. The method refers to the SAN having at least one HBA in each one host out of the first array, and the meta-zoning instructions carrying instructions for zoning, in a work zone, at least one HBA pertaining to a legitimate host with at least one legitimate storage device.

It is an object to provide a method with the SAN having at least one legitimate host out of the first array, with a plurality of HBAs. The meta-zoning instructions provide instructions for zoning in a work zone, each one out of the plurality of HBAs inside a legitimate host, with at least one legitimate storage device.

It is also an object to provide a method for burning-in the default zones in the SAN Switch, for automatically returning to and always start operation in default zoning, wherein the physical devices are mutually isolated. Furthermore, the SAN Switch comprises a plurality of ports, each port out of the plurality of ports having a port identity, and each one physical device is coupled to at least one port out of the plurality of ports. The security procedure is further characterized by comprising the step of verifying the legitimacy of each one of the physical devices independently of the port identity of the at least one port to which one physical device is coupled. In addition, the method deals with the SAN Switch comprising a plurality of ports, for coupling each one physical device to at least one port out of the plurality of ports, the method being further characterized by returning immediately the at least one port from which a physical device is decoupled, to a default zone. Moreover, there is provided a method where each one a port out of the plurality of ports of the SAN Switch always resides in a default zone when being coupled to a physical device.

It is another object yet to provide a method for Storage Area Network (SAN) booting. The SAN has physical devices with a first array of hosts (1) and a second array of storage devices (4). The SAN also has a storage network (5') with network links (5), a users network (6') with users network links (6), and a SAN Switch (2) coupled intermediate the first array and the second array and to each physical device via network links and to the users network via a users network link. The SAN Switch routes I/O commands to the physical devices and is configured for accepting zoning commands defining zones for communication between at least one host and at least one storage device. The method operates a binary zoning for booting, with default zoning and work zoning permitting the creation of, respectively, at least one default zone and at least one work zone. The binary zoning always first resides in default zoning for booting the first array of hosts in mutual isolation and starting the second array of storage devices, for verifying operation of the physical devices, and in the work mode zoning, having only operative physical devices.

It is another one more object to provide a method for configuring the storage network as a Fibre Channel network. The method comprises running the boot procedure and thereafter, creating, in work zoning, of at least one work zone comprising at least one operative host and at least one operative storage device. The method also comprises the steps of running continuously the booting procedure for presence and operation verification of the physical devices actually coupled in operation with the SAN, and rezoning in real time the at least one work zone according to configuration changes associated with presence and operation of the physical devices actually coupled to the SAN.

The method still further provides a System Administration (SA) workstation coupled to the users network and to the SAN Switch, for entering meta-zoning instructions via the SA workstation, the meta-zoning instructions defining default zoning and work zoning, and for programming automatically the SAN Switch into work zones for operative physical devices according to the meta-zoning instructions.

The method comprises burning-in the default zones in the SAN Switch, for automatically returning to and always start operation in the default zoning, wherein the physical devices are mutually isolated. Another aspect of the method provided is that the SAN Switch comprises a plurality of ports, for coupling each one physical device to at least one port out of the plurality of ports, the method being further characterized by returning immediately the at least one port from which a physical device is decoupled, to the default zone. A port out of the plurality of ports of the SAN Switch always resides in a default zone when being coupled to a physical device.

Still further, the method provides for a SAN Firewall packaged with the SAN Switch to form a single unit, and for the SAN Firewall and the SAN Switch to be functionally integrated to form a single unit package. The SAN Firewall functions operate on a host selected from the first array, or on a remote host coupled to the SAN Switch, or on a remote host coupled to the SAN Switch via a network link coupled to a global communication network.

It is yet another object of the invention to provide a system for operating SAN security and booting, with physical devices comprising a first array of hosts (1) and a second array of storage devices (4), a storage network (5') with storage network links (5), and a users network (6') with users network links (6). There is also a SAN Switch (2) coupled intermediate the first array and the second array and to each physical device via network links, and coupled to the users network via a users network link, the SAN Switch routing I/O commands to the physical devices. SAN Switch (2) is configured for accepting zoning commands defining zones for communication between at least one host and at least one storage device. The SAN Switch comprises a plurality of ports for coupling each one of the physical devices to at least one port out of the plurality of ports by at least one network link (5). The system with the SAN Firewall (3) is coupled by a storage network link to a SAN-Firewall-port (sf) accommodated in the SAN Switch and coupled by a user network link to the users network, the SAN Firewall being configured to automatically program the SAN Switch into zones, with each zone residing in either one of a binary zoning. The binary zoning comprises, in default zoning, at least one default zone counting only two ports, with a first SAN-Firewall-port coupled to the SAN Firewall and connected to a second device-port (h, d) coupled to and isolating a physical device, the SAN Firewall operating at least one security verification procedure on the isolated physical device. In work zoning, there is at least one work zone coupling at least three ports, with a single SAN-Firewall-port (sf), and at least two ports coupling only security verified physical devices counting at least one host port (h), and at least one storage device port (d).

There is provided, according to the system for SAN booting, physical devices with a first array of hosts (1) and a second array of storage devices (4), a storage network (5') with storage network links (5), and a users network (6') with users network links (6). There is also a SAN Switch (2) coupled intermediate the first array and the second array and to each physical device via network links, and coupled to the users network via a users network link. The SAN Switch routes I/O commands to the physical devices and is configured for accepting zoning commands defining zones for communication between at least one host and at least one storage device. The SAN Switch comprises a plurality of ports for coupling each one of the physical devices to at least one port out of the plurality of ports by at least one network link (5). The SAN Switch is configured for default zoning wherein each port out of the plurality of ports for coupling to a physical device is a mutually isolated default zone and the default zoning is burnt-in in the SAN Switch to always start operation in default zoning, whereby the physical device are mutually isolated. In addition, there is verified the operation of at least one host of the first array, and operatively zoning the at least one operative host with at least one storage device.

One object is to provide a Security Computer Program (SCP) operating with a SAN for security and booting. The SAN has physical devices comprising a first array of hosts (1), a second array of storage devices (4), and a third array of user workstations (7) comprising a System Administrator (SA) workstation (8). Each one host of the first array comprises at least one Host Bus Adaptor (HBA), and a SAN Switch (2, 2A) intermediate the first array and the second array, for routing I/O commands to the physical devices and for accepting zoning commands, the SAN Switch comprising a plurality of ports. There is also a storage network (5') with network links (5) coupling the SAN Switch to each one of the physical devices and to at least one port out of the plurality of ports by at least one network link (5). The SAN Switch routes I/O commands to the physical devices and is configured for accepting zoning commands defining zones for communication between at least one host and at least one storage device. Provided additionally is a users network (6') with network links (6) coupled to the third array, to the SAN Firewall and to the SAN Switch. The SCP has at least one SAN Agent and a Firewall Software operating in mutual association, with an at least one SAN Agent operating in each one host out of the first array, and the Firewall Software operating in the SAN Firewall. The Firewall Software has a binary zoning program with default zoning and work zoning, for zoning in response to commands derived from meta zoning instructions, comprising defaults zones and work zones. These have a default zone operating on two ports only, the first port being a SAN Firewall port (sf) to which the SAN Firewall is coupled and the second port being either one of a host port (h) and a storage device port (d) to which one physical device is coupled. Each default zone mutually isolating the physical device, to perform at least one security and booting procedure in isolation. A work zone consists of only physical devices verified by the verification procedure intended for coupling at least one host and at least one storage device in associative operation, the default zone comprising at least one host port, one storage device port and the SAN Firewall port.

Another object of the Security Computer Program, in the SAN Agent, is to provide an identity key being sent in periodic repetition to the Firewall Software, and in the Firewall Software, a host authentication procedure of the verification procedure for operation with a host identity key received from a SAN Agent. A storage device identification procedure is included in the verification procedure whereby the Firewall Software accesses each one storage device of the second array to check identity parameters with a World Wide Name (WWN) and an at least one Logic Unit Number (LUN).

The Security Computer Program provides running continuously of the security procedure for presence and legitimacy verification of the physical devices actually coupled in operation with the SAN, and for rezoning in real time the at least one work zone according to configuration changes associated with running the security procedure continuously.

There is provided a Security Computer Program with, in default zoning, an HBA is identified by a first WWN (World Wide Number), a storage device comprises at least one LU (Logical Unit), and identified by a second WWN and by at least one LUN (Logical Unit Number). There is also a list of presence operated and updated by the Firewall Software to record instant configuration of the physical devices coupled to the SAN with identifiers for each host of the first array. This includes a first WWN of an at least one HBA, and for each storage device of the second array, a second WWN and at least one LUN, and port identity coupled to physical devices at the SAN Switch. The security procedure has, in work zoning, a status map recording the instant configuration of legitimate physical devices coupled to the SAN with the identifiers. Therein, each one host out of the first array is authenticated independently of the first WWN and of the at least one HBA name, and each one storage device out of the second array is identified by the second WWN and by the at least one LUN.

It is yet another object to provide a Security Computer Program operating with a SAN for booting, the SAN having physical devices with a first array of hosts (1) and a second array of storage devices (4), a storage network (5') with network links (5), and a users network (6') with users network links (6). The SCP has a SAN Switch (2) coupled intermediate the first array and the second array and to each physical device via network links and to the users network via a users network link. The SAN Switch routes I/O commands to the physical devices and is configured for accepting zoning commands defining zones for communication between at least one host and at least one storage device. The SCP operates a binary zoning program for booting, with default zoning and work zoning permitting the creation of, respectively, at least one default zone and at least one work zone, the binary zoning program always first residing in default zoning. In default zoning, booting the first array of hosts in mutual isolation and starting the second array of storage devices, for verifying operation of the physical devices, and in the work zoning, having only operative physical devices.

There is provided additionally, a listing procedure for listing the physical devices coupled to the SAN Switch, a status map procedure for building and maintaining the status map recording the legitimate physical devices coupled to the SAN Switch, and a work zone procedure for commanding automatic zoning of legitimate physical devices recorded in the status map.

BRIEF DESCRIPTION OF THE DRAWINGS

In order to understand the invention and to see how it may be carried out in practice, preferred embodiment will now be described, by way of non-limiting examples only, with reference to the accompanying drawings, in which.

DESCRIPTION OF PREFERRED EMBODIMENTS

Figure 1:
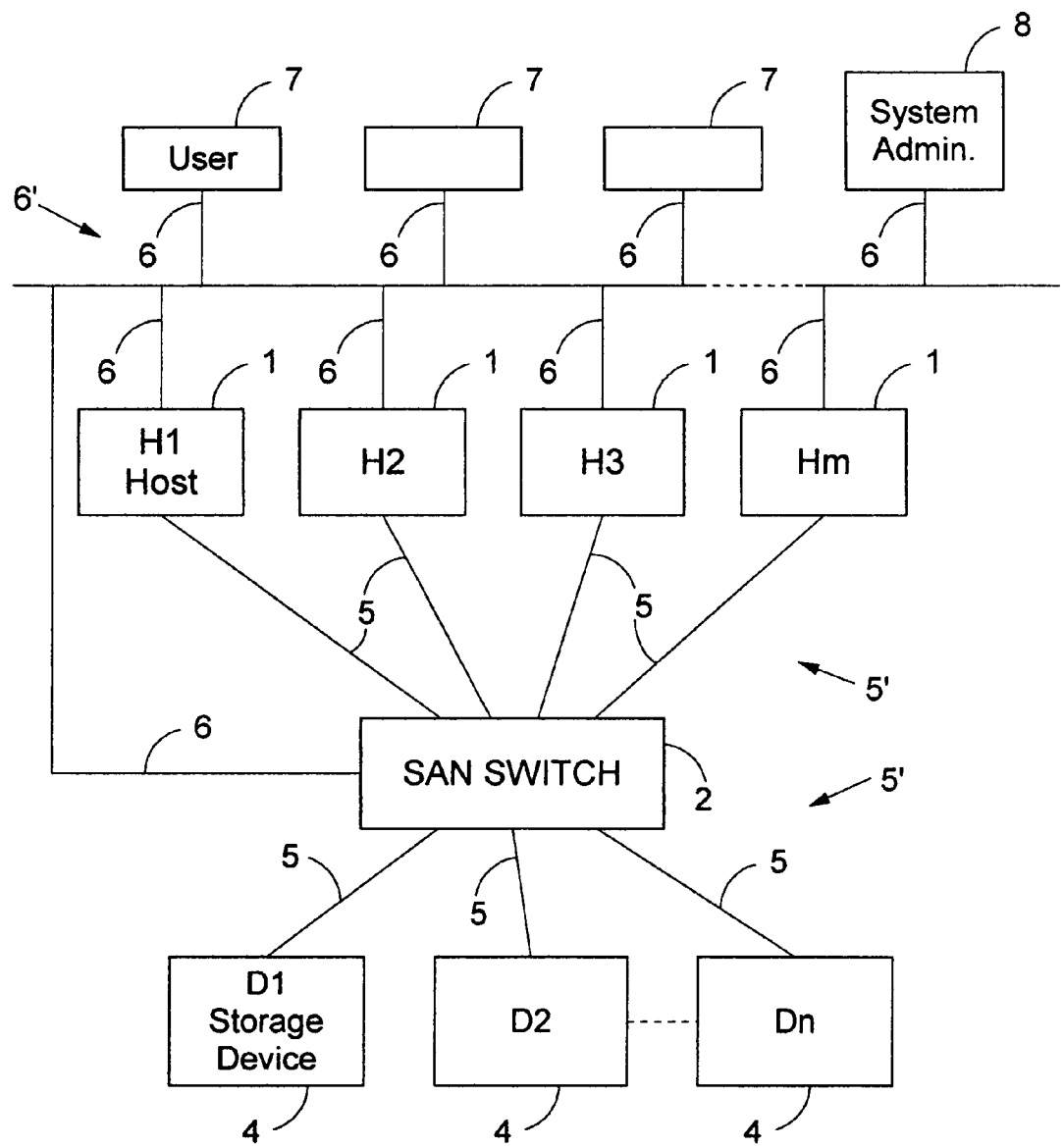
FIG. 1 is a block diagram of a prior art SAN.

The necessity to provide means to authenticate hosts 1 and to ascertain the identity of storage devices 4 was explained above. A solution to the lack of security in a SAN may be provided by enforcing the following steps. First, requiring the authentication of each host 1; and second, in parallel, requesting identification of each storage device 4. Before permitting coupling between physical devices on the SAN network, these physical devices should be subjected to verification procedures, known to the art, available and reliable, that employ only limited processing resources. A third prerequisite is the elimination of manual port zoning commands, which must be replaced by meta-zoning instructions containing decisions taken by the System Administrator for further automatic zoning of the SAN Switch 2. This means that the SA makes decisions and that the actual zoning chores are performed automatically by software, hardware or a combination thereof.

One may consider a SA entering meta-zoning instructions at his workstation 8, which means, deciding what host, or hosts 1, will be zoned to operate together with one or more storage device 4. Then, according to the present invention, each host 1 in turn will be authenticated, instead of the one or many HBAs the host houses, and in place of the ports of the SAN Switch 2.

In other words, the HBA(s) of a host 1 that is positively authenticated as legitimate, become(s) automatically legitimate as well. Storage devices 4, after being affirmatively identified, also become legitimate. The identity of the ports now becomes irrelevant for security purposes. Incidentally, a storage device 4 is identified by the 8 bytes of is WWN and by the 8 bytes of its Logical Unit Number (LUN).

In the context of this disclosure, the term "legitimate" is considered as meaning: "screened for security purposes and accepted as a genuine and authentic physical device."

In operation, the configuration of a SAN is not static: the SA may decide to add resources, or on the contrary, physical devices sometimes fail or are removed for maintenance purposes. The solution proposed by the invention will regard any physical device added to the SAN network as suspect and unaccepted until authenticated or properly identified. Moreover, the disconnection of a physical device causes the immediate removal of the port to which it was connected from the zone(s) in which it was operative.

Figure 2:
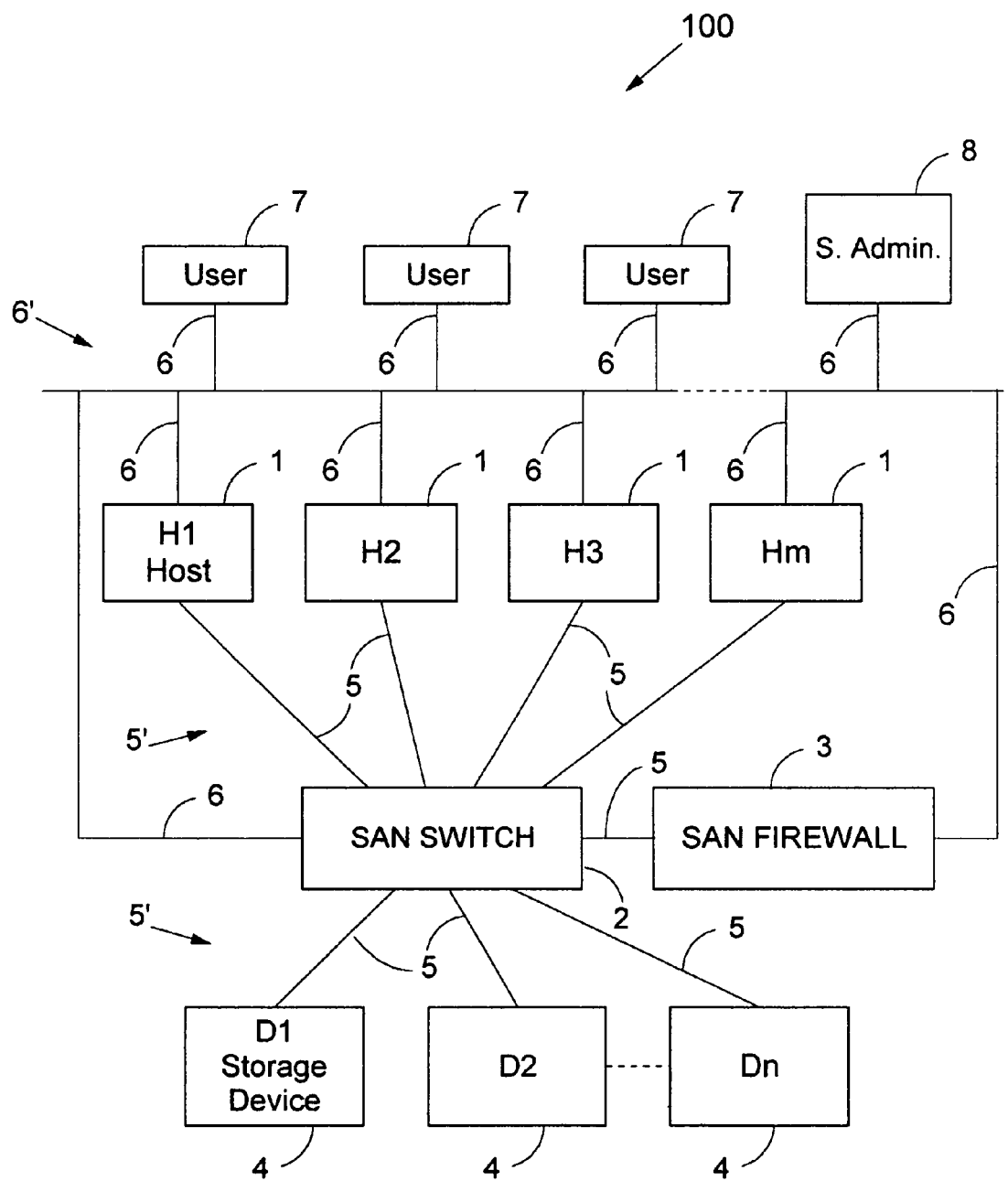
FIG. 2 is a block diagram of a SAN equipped with security monitoring.

FIG. 2 shows a first embodiment 100. The same numerals refer to the same elements in the various Figures. The SAN supports an array of m hosts 1 and of n storage devices 4, with users 7 and 8 coupled to the user network 6'. The SAN Switch 2 is coupled to a SAN Firewall 3 that is also linked to a SA workstation 8, acting as both a System Administration workstation and a Security Administration workstation. Possibly, a separate Security Administration and a separate System Administration workstation 8 may be coupled to the SAN instead of the single SA workstation as depicted in FIG. 2. It is noted that both the SAN Switch 2 and the SAN Firewall 3 are equipped with processing means supported by memory, and configured to run computer programs stored in magnetic memory.

The SAN Firewall 3 is coupled to the SAN Switch 2 by a storage network link 5 and to the user network 6' by a user network link 6. Although obvious, it is important to note that the SAN Firewall 3 may gain access to the SAN Switch 2 via either a storage network link 5 or a user network link 6. This feature allows communication between the HBA(s) of any host(s) 1 and the SAN Firewall 3.

The SA workstation 8, coupled to the user network 6', is privileged with direct access to the SAN Firewall 3. Accordingly, the SA Administrator may operate the SA workstation 8 to send meta-zoning instructions to the SAN Firewall 3, which in turn, will take care of the automatic programming of the SAN Switch 2 into zones, according to those meta-zoning instructions.

For monitoring of security, the SAN Switch 2 is programmed to operate in binary zoning: first in default zoning and next, in a work zoning. The default zoning creates default zones, which are "dead end" zones, leading only to a SAN Firewall port sf coupled to the SAN Firewall 3, and to a port connected to a physical device, either a host port hp or a storage device port dp. Each default zone acts as a secluded check-zone wherein an authentication or identification procedure is operated on the physical devices via the SAN Firewall port sf, before granting permission for inter-connection and zoning with other physical devices of the SAN. In other words, a default zone may be regarded not as a zone but as a singular condition of zero zoning, or no zoning at all.

To keep the description simple, it is first assumed that each host 1 has only one Host Bus Adaptor, or HBA.

Inside the SAN Switch 2, each default zone is limited to but one single connection between one specific physical device of the SAN and the SAN Firewall 3. The first end of the connection link is coupled to either a host 1 or a storage device 4, and the second end of the same link is coupled to the SAN Firewall 3. In other words, each physical device remains isolated and captive within one default zone while in default zoning. Furthermore, the number of default zones equals the sum of the physical devices coupled to the Switch 2. Assuming an array of hosts 1 designated as (H1, H2, ..., Hm) where each host has only one HBA, and an array of storage devices 4 labeled as (D1, D2, ..., Dn), there are then m+n separate default zones, all coupled to the SAN Firewall 3. When any of the hosts 1 has more than a single HBA, then the number of default zones is the sum of the total number of HBAs in all the hosts and of the number of storage devices 4.

It is appreciated that although reference is made to a single SAN Switch 2, that switch may be built out of a plurality of switches coupled in one of the various known circuit connection manners to form one larger switch, which is regarded to perform and respond as if being configured as one single SAN Switch 2. It is also noted that the coupling of switches is well known to the art and therefore, needs not to be described.

Figure 3:
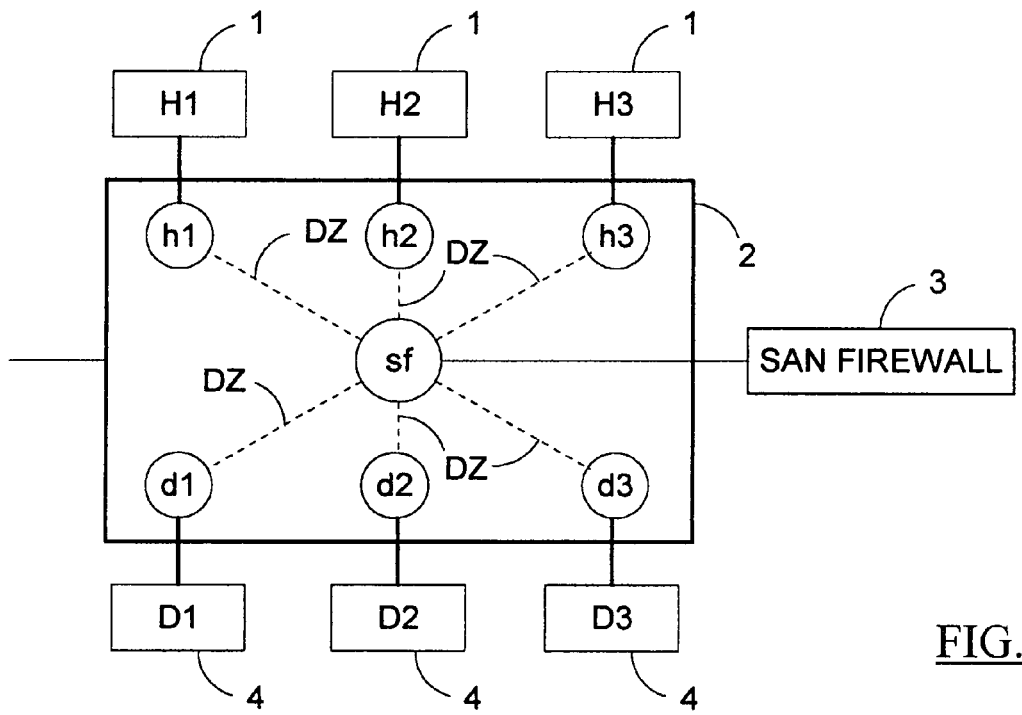
FIG. 3 shows an example of default zoning of the SAN Switch of FIG. 2.

Reference is now made to FIG. 3 to illustrate a simplified example of default zoning connections in the SAN Switch 2. Only a portion of the SAN is shown, with an array of three hosts 1, H1, H2, and H3, connected to host ports, respectively h1, h2, and h3. In this example, there is only one HBA per host.

In the same manner, three storage devices 4, D1, D2, and D3, are connected to an array of storage device ports, respectively d1, d2, and d3. In addition, one SAN Firewall port, designated as sf, is linked to the SAN Firewall 3. In FIG. 3, each dotted line designated as DZ, leading from the port sf to the port of one physical device, represents one single default zone, clearly illustrating that each default zone is isolated from any other default zone. This default zoning is burnt-in into the SAN Switch 2 and will always prevail on start-up. The default zoning is thus inherently reset on each shut down, always initiating a SAN start in default zoning. Furthermore, on disconnection of a physical device from a port of the SAN Switch 2, that port will automatically be isolated in a default zone. Therefore, upon coupling to a port of the SAN Switch 2, a physical device will always meet a default zone.

The security procedures described below, are all performed while the SAN Switch 2 resides in default zoning, to ascertain the authenticity of each host 1 and the identity of each storage device 4 before allowing the coupling of any communication between these physical devices 1 and 4. Next, in work zoning, where the physical devices are coupled in mutual operative association, work zones are defined only after successful completion of the security checks and procedures. These work zones are derived from meta-zoning instructions defined at the SA workstation 8 and communicated via the user network 6' to the SAN Firewall 3, the latter generating commands for the automatic programming of the SAN Switch 2 into separate and distinct work zones.

For the sake of illustration, it is assumed that an SA manages a SAN with three hosts 1, namely H1, H2, H3, and with three storage devices, denominated D1, D2, D3, as depicted in FIG. 3. It is further assumed that the SA meta-zones the access of the selected hosts 1 with the following specific storage device 4, in work zones defined in FIG. 3: hosts H1 and H2 with storage device D3, host H2 and storage device 2, again hosts H1 and H2 but now with storage devices D1 and D2, and finally host H3 also with storage devices D1 and D2. These access permissions are the meta-zoning instructions, defined by the SA via his SA workstation 8, also related to as a Permission Table, shown below as Table 1.

TABLE 1

| WORK ZONE No. | HOST | STORAGE DEVICE |
| --- | --- | --- |
| 1 | H1, H2 | D3 |
| 2 | H2 | D2 |
| 3 | H1, H2 | D1, D2 |
| 4 | H3 | D1, D2 |

The meta-zoning instructions presented in Table 1 are flexible and easily changeable, allowing for addition, or deletion, independently of physical devices and of work zones. In Table 1, the empty rows indicate that more physical devices may be added to the SAN, all to be managed in the same way. Evidently, during the operation of a SAN, hosts 1 and storage devices 4 may be retrieved from the network, by either deleting their access permission, or by physical removal, for maintenance for example, or as result of a crash.

The meta-zoning instructions entered by the SA at the SA workstation 8, designate hosts 1, or the HBAs of these hosts 1, for coupling with storage devices 4. It is understood that the task of the SA is supported by details pertaining to the physical devices, such as the WWN of HBAs, the WWNs and LUNs of storage devices, identity parameters and other necessary details being automatically presented on screen and added to the meta-zoning instruction at the SA workstation. Such information is possibly entered as a permission table.

A SAN Security Computer Program, or SCP for short, is operative on the SAN to perform the security clearance of the physical devices, to receive meta-zoning instructions from the SA workstation 8, to automatically program the SAN Switch 2 accordingly into working zones, and to dynamically control the security of the instant configuration of the SAN in real time.

Figure 4:
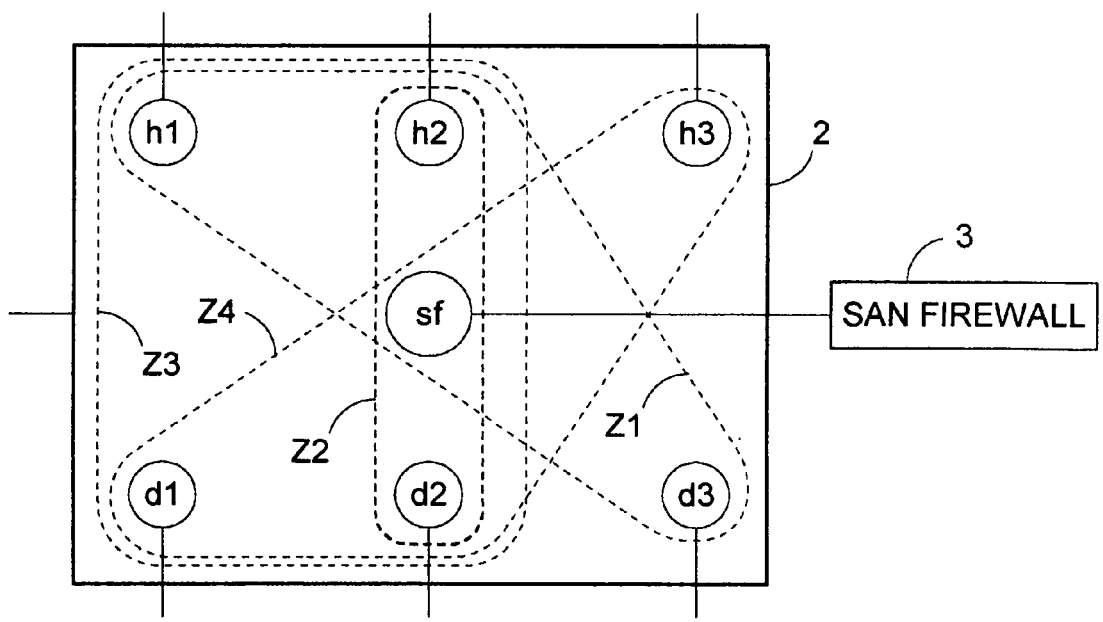
FIG. 4 depicts an example of a work zoning for the configuration of FIG. 3.

FIG. 4 depicts an example of the work zones in the SAN Switch 2, showing the four automatically programmed work zones, as derived from the meta-zoning instructions of Table 1, for the configuration of physical devices 1 and 4, shown in FIG. 3. It is noted that a work zone always consists of at least three ports, namely the SAN Firewall port sf and at least one port of each a host 1 and a storage device 4. The first work zone Z1 is formed by the ports h1, h2 and d3, a second work zone Z2 consists of the ports h2 and d2, a third work zone Z3 involves the ports h1, h2, d1 and d2, and last, a fourth work zone Z4 includes ports h3, d1 and d2. The automatic derivation of work zones from the meta zoning instructions is achieved by help of a computer program currently provided by the manufacturer of the SAN Switch 2, such as for example, Brocade Communications Systems, Inc., of 1745 Technology Drive, San Jose, Calif. 95110, USA, manufacturer of the Model called Silkworm 2800.

It is noted that the work zones are created solely on the basis of the meta-zoning instructions that specify only hosts 1 and storage devices 4, as transmitted to the SAN Firewall 3.

The SCP consists essentially of two different portions, each portion running possibly in a different location but remaining in communication for interactive operation. A portion of the real-time SCP runs in the SAN Firewall 3 to automatically program the SAN Switch 2, in contrast with the manual input of the port-to-port connections for zoning, as by the prior art. Therefore, since the physical devices are coupled into zones according to their authenticity and identity, and not according to their port number at the SAN Switch 2, the possibility of a manual connection error is eliminated: manual connection are not needed anymore.

The first portion of the SCP, or Firewall Software, runs in the SAN Firewall 3, sometimes referred to as the Firewall Configuration Software. The second portion of the SCP operates in each one of the hosts 1, and is related to as the Firewall Agent, or Firewall Service. Each one of the hosts 1 controls the operation of its own Firewall Agent.

When in the default zone, before access is permitted to work zoning, each single one of the various physical devices of the SAN is interrogated for verification, but the security procedure is different for the hosts 1 and for the storage devices 4. After verification, described below, only the positively identified physical devices are approved and mapped in a Status Map managed by the SAN Firewall 3. The Status Map lists identified and authorized physical devices, their identity, the HBAs and the port numbers of the SAN Switch 2. Physical devices 1 and 4 that are not security approved by the SCP are kept isolated and remain in default-zoning mode.

On start-up, the SAN Switch 2 always starts in default zoning, as explained above. The presence and identity details of each separate physical device coupled to a port of the SAN Switch 2 is collected by the SAN Firewall 3 via the SAN Firewall port sf. Such details include, among others, the WWN of each HBA, the WWN and the LUN of each storage device 4 as well as the related port number identity.

Each booted host 1 coupled to the SAN is submitted to a security procedure, such as an encrypted authentication procedure. The login is accompanied by, for example, an identity key, inserted a priory by the SA, being sent via an HBA, to the SAN Firewall 3. In the beginning, before authentication, the host 1 is listed, as being a physical device coupled to the SAN, but is not yet approved. It is then that an appropriately selected available authentication computer program is operated by the Firewall Software to authenticate that host 1. Evidently, the identity key presented for verification was previously inserted in that host 1 by the SA, to operate in association with the authentication computer program run by the SAN Firewall 3. This same procedure is repeated for all the hosts 1 coupled to the SAN, listing all the HBAs, when there is more than one HBA per host.

When the identification key matches the requirements of the Firewall Software encrypted authentication procedure, then, and only then, is the host 1 authenticated and listed in the Status Map as valid for work zoning purposes. At the same time, the WWN of each HBA residing in that host 1 and the associated port number is listed and is added to the Status Map. On the contrary, if the host 1 is for example a rogue plugged into a port of the SAN Switch 2, the identity key will not match, or be missing. That rogue host 1 is then considered as negative, regarded as illegal, kept safely isolated in a default zone and evidently not listed in the Status Map.

Authentication computer programs are known in the art, and for the purpose of host identification, any suitable authentication program fitting the task may be selected.

The identification procedure for a storage device 4 coupled to the SAN is initiated by a polling procedure run by the Firewall Software. Polling queries pass from the SAN Firewall 3 through the default zone of the SAN Switch 2, via the storage link 5 to the interrogated storage device 4. The Firewall Software questions each storage device 4 in turn for identity, by requesting both its WWN and its Logical Unit Number, or LUN. When both the requested WWN and the LUN match those fitting and corresponding to the storage devices 4 according to the meta-zoning instructions previously entered by the SA, then that WWN, together with the LUN of the storage device 4 and the port number are listed in the Status Map along with the legal and authorized storage devices. Else, the storage device 4 is regarded as illegal, kept secluded in a default zone of the SAN Switch 2, and does not appear in the Status Map.

As a consequence of the security procedures, the Status Map now contains solely authorized hosts 1, their respective HBAs, authorized storage devices 4, and the associated port numbers.

It was already mentioned that to enhance security, the work zoning configuration of the SAN Switch 2 is never saved, but built anew from scratch, after every power-up of the SAN, thus starting from default zoning. Upon uncoupling of an authorized physical device from a port, that port automatically returns to default zoning so that the coupling of a physical device to an available port always meets a default zone. An unauthorized host, when uncoupled from a port, always leaves a default zone, but will be deleted from the list of physical devices coupled to the SAN.

In practice, a host may comprise more than one HBA and each HBA terminates as a port, or host port, in the SAN Switch 2. The result is that the number of coupled ports in a SAN Switch 2 now actually equals at least to the sum of the number of HBAs of all the hosts 1, plus the number of all the storage devices 4, plus one SAN Firewall port. For the sake of exactitude, in practice, a second SAN Firewall 3 is used for redundancy purposes, thereby increasing the number of ports. This redundant SAN Firewall 3 is not shown in the Figs., and is not referred to below, to keep the description simple.

Figure 5:
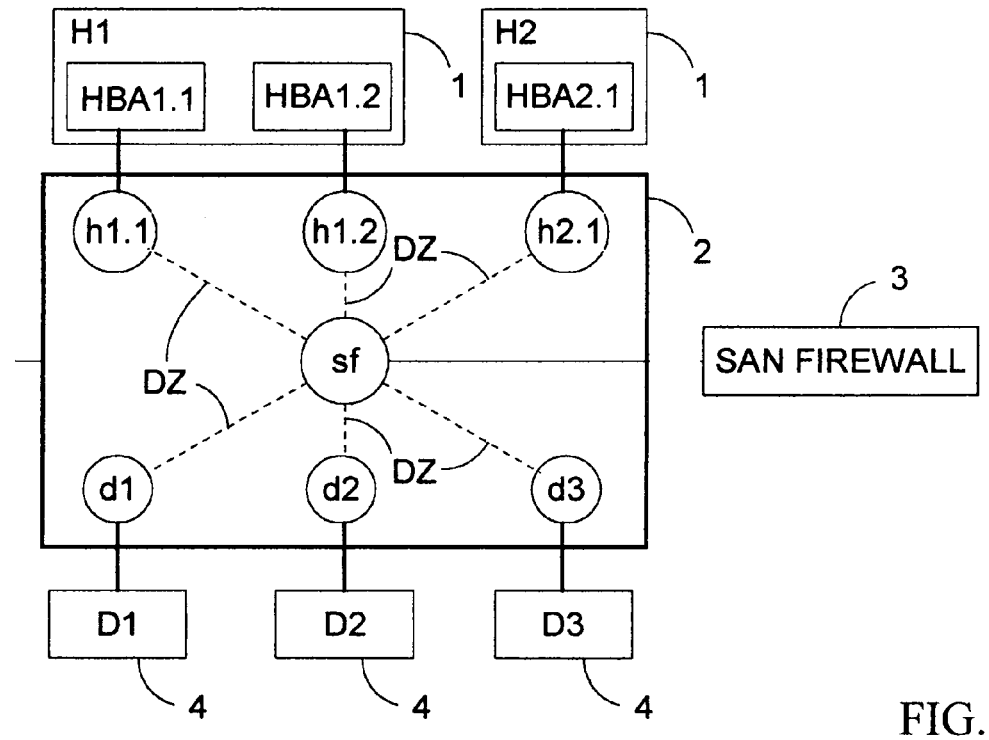
FIG. 5 is an example of default zoning for more than one HBA per host.

A simplified illustration with more than one HBA per host 1 is presented in FIG. 5. The array of hosts 1 is limited to a first and to a second host, respectively H1 and H2, where the first host features two HBAs, namely HBA1,1 and HBA1,2, each having an access port at the SAN Switch 2, respectively h1,1 and h1,2. The second host H2 has only one HBA, designated as HBA2,1, corresponding to a port indicated as h2, 1.

Figure 6:
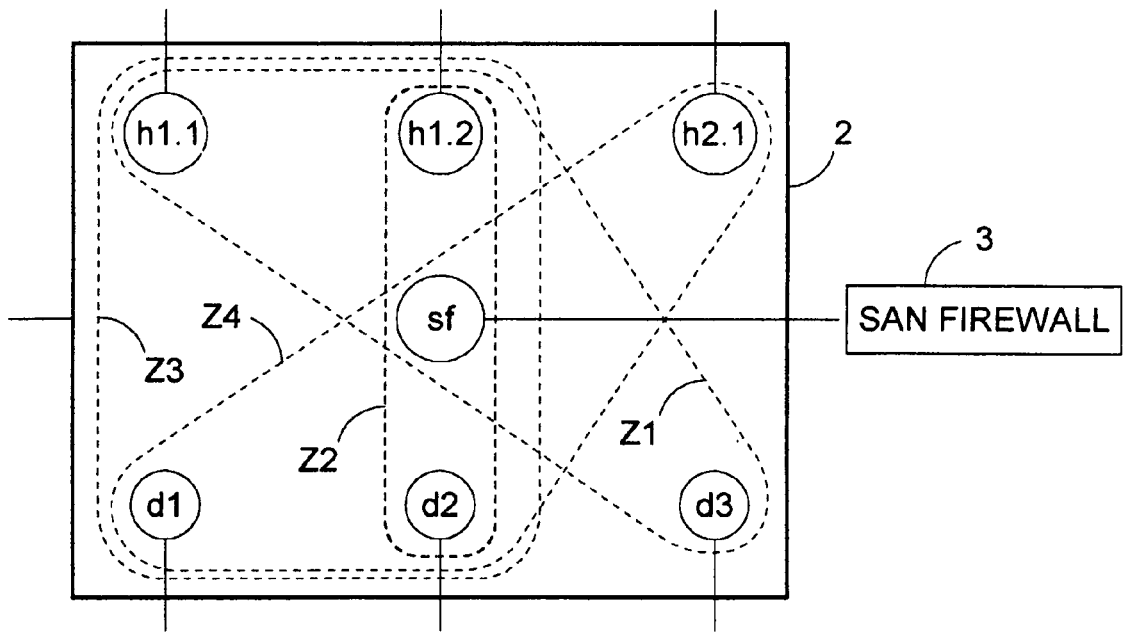
FIG. 6 illustrates an example of work zoning for the configuration of FIG. 5.

A work zoning example of the configuration of ports shown in FIG. 5 is depicted in FIG. 6. For zoning purposes, it is possible to simply envision each HBA as a host 1 with a single HBA, so that the various HBAs form an enlarged array of hosts 1. Such visualization refers back to and reinstates the description related to FIG. 3. As an illustration, FIG. 6 depicts the identical number of zones with the identical number of ports as in FIG. 4.

Host Boot

Figure 7:
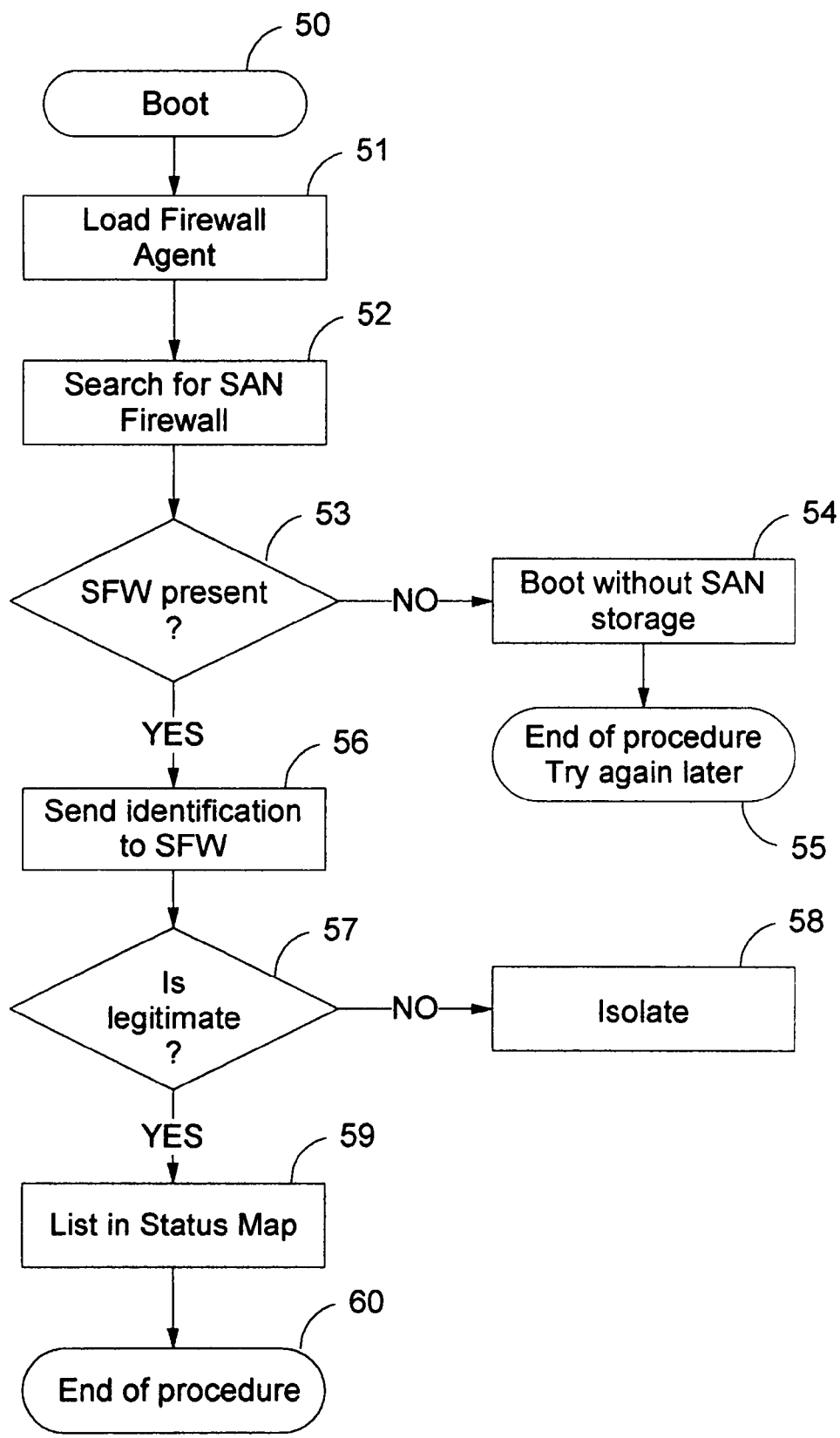
FIG. 7 presents a flowchart of the boot procedure of a host.

With reference to FIG. 7, the operation of the SAN Security Program, SCP, is now described. When a host 1 is booted, as in step 50, in mutual isolation from the other hosts 1, the Firewall Agent, running in that host 1, is loaded, by step 51. The Firewall Agent searches for the SAN Firewall 3 in step 52, and reaches a bifurcation in step 53. If the SAN Firewall 3 is absent, then step 54 allows for boot-up without communication links to SAN storage devices 4. Step 55 is a temporary end of procedure, before returning for another try to find the SAN Firewall 3.

However, if step 53 finds the SAN Firewall 3, then, as in step 56, the host 1 sends the identity key, for unique encrypted identification, to the Firewall Software running in the SAN Firewall 3. In turn, step 57 awaits the authentication decision: a negative outcome ends the procedure and keeps the host 1 in question isolated, with the Firewall 3 as a barrier, as by step 58. Possibly, but not shown in FIG. 7, other trial follow. Conversely, a positive identification results in the authentication of the host 1, as in step 59, and the listing of the host as well as of the WWN(s), the port numbers of the one or more HBA(s), into the Status Map. That host 1 is now recognized and tagged as legitimate for work zoning purposes, and the at least one HBA of the host is thus security-wise accepted to operate in association with one or more authorized storage device(s) 4 according to the specific work zones programmed by the SAN Firewall 3 into the SAN Switch 2. Step 60 ends the security procedure for a host 1.

The identification of storage devices 4 is considered in the context of the SAN working environment as being dynamic, where physical devices are sometimes added or removed. For instance, storage capacity may be increased or reduced by the SA, or by malfunction when a storage device crashes. The same is valid for the computing power, relating to the hosts 1.

Figure 8:
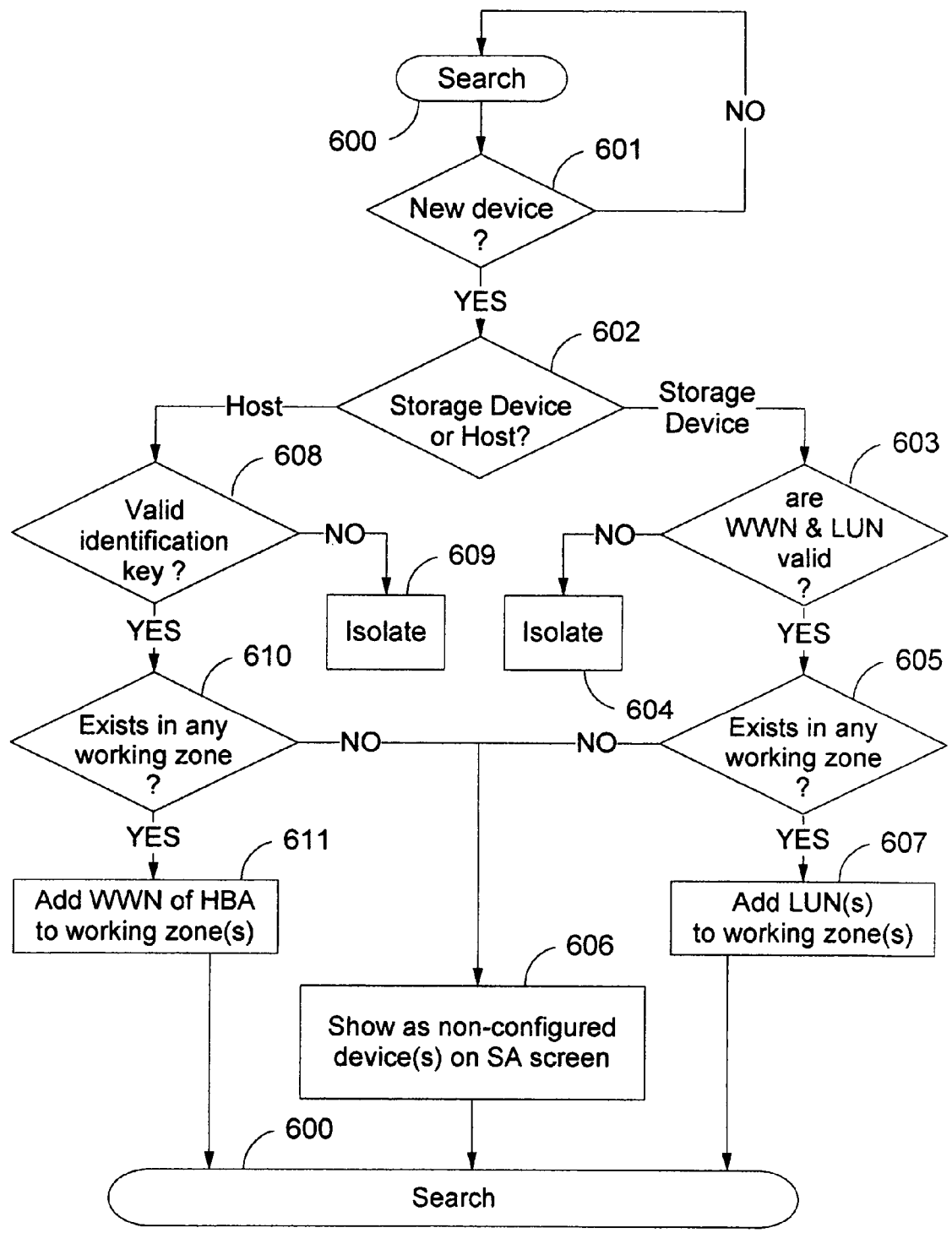
FIG. 8 is a flowchart of the procedure for physical device discovery and recognition.

In FIG. 8, the identification procedure of a storage device 4 is described, as a part of the procedure for the handling of newly discovered physical devices.

On start-up of the SAN, step 600 conducts a search in default zoning, since the SAN Switch 2 always starts in default zoning, on all the ports coupled to physical devices. The search is initiated by the SAN Firewall 3, on the instant configuration of physical devices coupled to the SAN. A deleted physical device becomes automatically non-accessible to the search, but a new physical device must be detected, verified, and zoned, to become effective. New hosts 1 announce themselves sequentially via their HBA(s) to the SAN Firewall 3, while that same SAN Firewall sequentially initiates searches for new storage devices 4. Hence, if a new physical device is detected by step 601, the search procedure continues, but else, command returns to step 600, for another search, in constant repetition, for continuous real time update. Whenever a new physical device is found, in step 601, it is necessary to distinguish between a host 1 and a storage device 4.

For a storage device 4, in step 603, the WWN and the LUN are checked for identity, to match with a list of such devices entered as a permission table at the time of meta zoning. An invalid storage device 4 is isolated in step 604, while for a legitimate storage device 4, the procedure passes to step 605. There, it is checked if the storage device 4 is assigned by the SA in the meta-zoning instructions. If not assigned, then control flows to step 606, to display this fact on the SA workstation 8, and for return to step 600 for a further search.

When the storage device 4 is detected by step 605 as being a member of a work zone, then the WWN, the LUN, and the port number thereof are added to the Status Map, and the storage device is authorized as a legal physical device of the SAN, as by step 607. Finally, another search starts after control is returned to step 600.

Step 602 responds to the detection of the announcement of a new host 1 by calling for an authentication certification test in step 608. The verification test is possibly based on any selected and available identity authentication method, with encryption techniques, and/or public and private keys. An unauthorized host 1 is routed to step 609 and kept isolated. If the host 1 is authenticated, then step 610 checks if that host is listed in the meta zoning instructions. If so, then the next step 611 adds the one or more WWN(s) of the HBA(s) and the related port number(s) in the Status Map, and proceeds to step 600 for a further search loop.

SAN Firewall Structure

Figure 9:
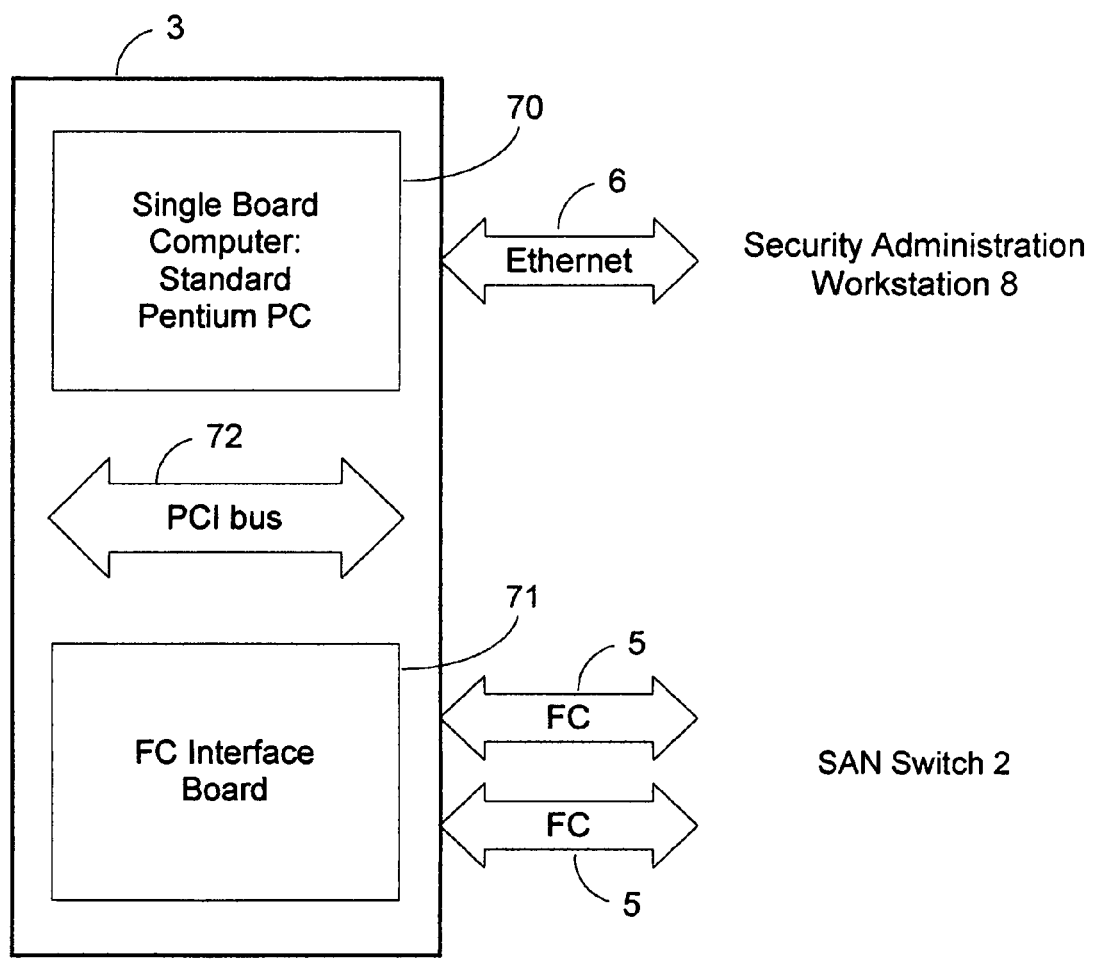
FIG. 9 depicts the main hardware structural blocks of the SAN Firewall 3.

The main structural blocks of the SAN Firewall 3 are now presented as an example only, with reference to FIG. 9. A standard Pentium based Single Board Computer 70 (SBC 70) is connected to a Fibre Channel Interface Board 71 (FC-IB 71) through a PCI bus 72. The SBC 70 runs a Windows NT (Win NT) operating system featuring a built-in web-server for communication with the SA workstation 8 from where the security control is operated. The Win NT is necessary to allow the SA to access the FC-IB 71 from the SA workstation 8 linked to the users network, shown as an Ethernet link 6 in FIG. 9. Therefore, the SBC 70 also features an Ethernet port, not shown in FIG. 9 for the sake of simplicity, used to connect the SAN Firewall 3 to the user network by the Ethernet link 6. From the SA workstation 8 it is thus possible to access the SAN Switch 2 to program the zoning.

Details of the connections and of the processor of the Fibre Channel Interface Board 71 (FC IB 71) are not shown in FIG. 9. However, the FC-IB 71 operates under the control of an Ixworks real-time operating system (Ixworks RTOS) and is coupled by at least one Fiber Channel link 5 to the SAN Switch 2 shown in FIG. 1. Two FC links 5, for redundancy, are shown in FIG. 9.

Figure 10:
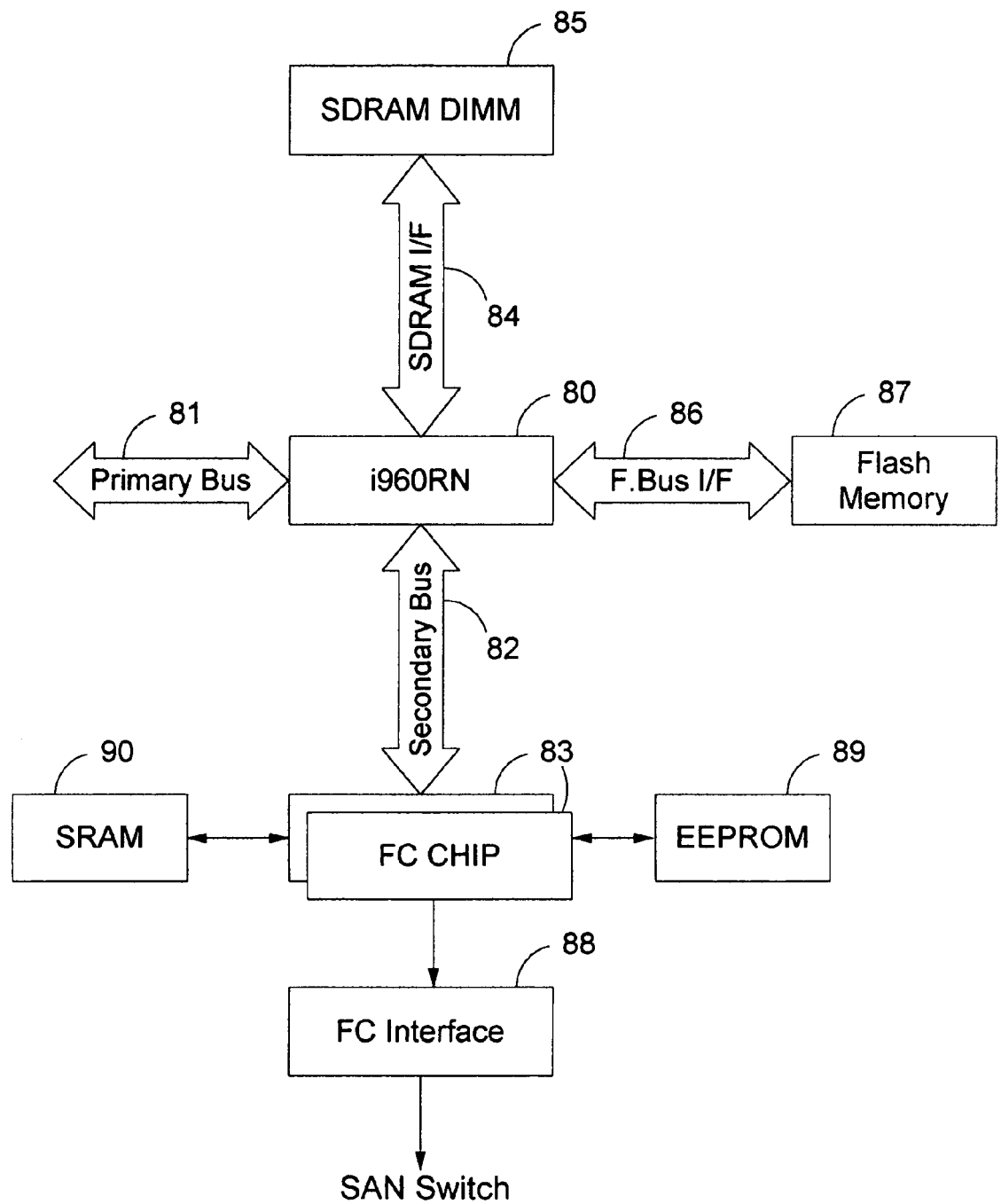
FIG. 10 illustrates details of the elements of the Fibre Channel Interface Board.

FIG. 10 depicts in more details the elements of the Fibre Channel Interface Board 71, or FC-IB 71, shown in FIG. 9 as a building block of the SAN Firewall 3. An i960 RN processor 80 operates the Ixworks real time operating system of the SAN Firewall 3. The i960 RN processor 80 is coupled by a primary 64-bit bus PCI 81 to the SBC 70 seen in FIG. 9, and by a secondary 64-bit bus PCI 82 to a couple of Fibre Channel chips 83. There are two Fibre Channel chips 83 for redundancy purposes, although reference will be made to a single Fibre Channel chip 83. In addition, the i960 RN processor 80 is also linked by a SDRAM Interface 84 to a SDRAM DIMM memory 85 and by a Flash Bus Interface 86 to a non-volatile Flash memory 87. The Flash memory 87 contains the configuration and software of the SAN Firewall 3.

The FC chip 83 is a Qlogic chip that is connected to the SAN Switch 2 by a Fibre Channel Interface 88. Other elements connected to the FC chip 83 comprise an Optional Serial EEPROM 89 and a SRAM 90.

The primary PCI bus 81 is used for information exchange with the NT Operating System running on the SBC 70, shown in FIG. 2, to allow communication with the SA workstation 8. The secondary PCI bus 82 is coupled to the FC chips 83 for communication with the SAN Switch 2. More components are attached to the FC-IB 71 but are not described since they are standard and do not add to the explanations.

Figure 11:
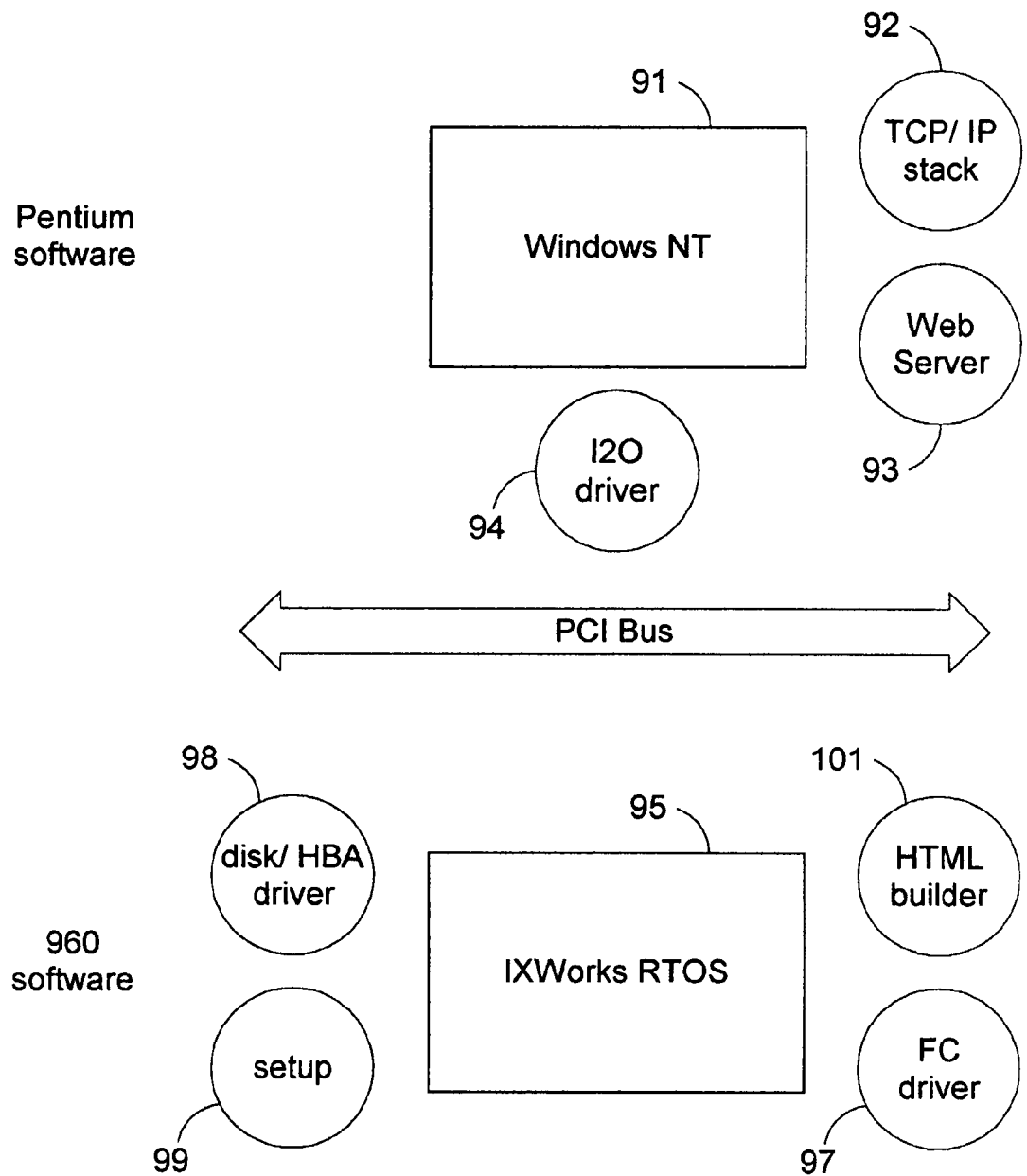
FIG. 11 shows the principal software modules of the SAN Firewall 3.

Referring now to FIG. 11, the principal software modules of the SAN Firewall 3 are depicted. The programs referred to as Pentium software programs are run by the Win NT on the Single Board Computer 70 (SBC 70) while those denominated as 960 programs are run by the i960 RN processor 80 on the FC-IB 71.

The software computer programs running on the Pentium comprises, amongst others, the Windows NT operating system 91 (Windows NT 91), with a standard TCP/IP stack 92, a web server 93, and an I2O device driver module 94. The I2O module 94 executes the data communication tasks between the Windows NT 91 and the Ixworks Real Time Operating System 95 (Ixworks RTOS 95) and retrieves the HTML pages used by the SA workstation 8 for configuration control and for zoning.

The 960 programs comprise the Ixworks Real Time Operating System 95 (IX RTOS 95) including a built-in I2O Support Module (not shown in FIG. 11). The I2O Support Module communicates with the I2O driver 94 of the Windows NT operating system 91. The IX RTOS 95 also runs the following software modules: an FC driver 97, a Disk/HBA driver 98, a Setup 99, and an HTML builder 101.

The FC driver module 97, programmed according to the Qlogic HBA firmware specifications, handles the FC software interface for communication of the SAN Firewall 3 with the SAN Switch 2. In other words, the FC driver module 97 enables FC communication between to the SAN Firewall 3 and the SAN Switch 2.

The HTML pages are generated by the HTML-builder 101 module for communication with the SA workstation 8.

Furthermore, the disk/HBA module is in charge of communications between the SAN Firewall 3 and the storage devices 4 as well as with each HBA in the hosts 1.

The Setup module 99 manages the Status Map and the permissions of access of the hosts 1 to the storage devices 4.

Additional Embodiments

Figure 12:
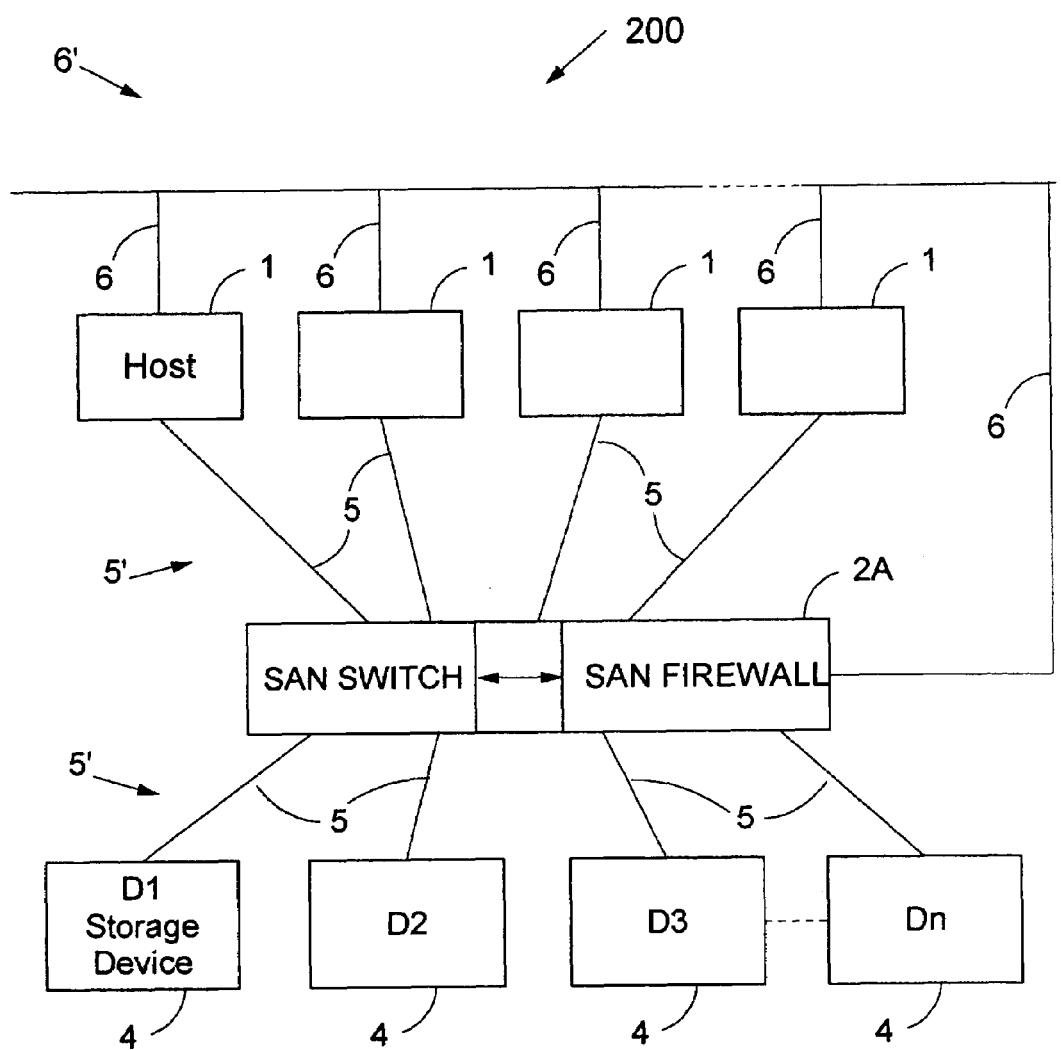
FIG. 12 is another embodiment of the SAN security shown in FIG. 2.
Figure 13:
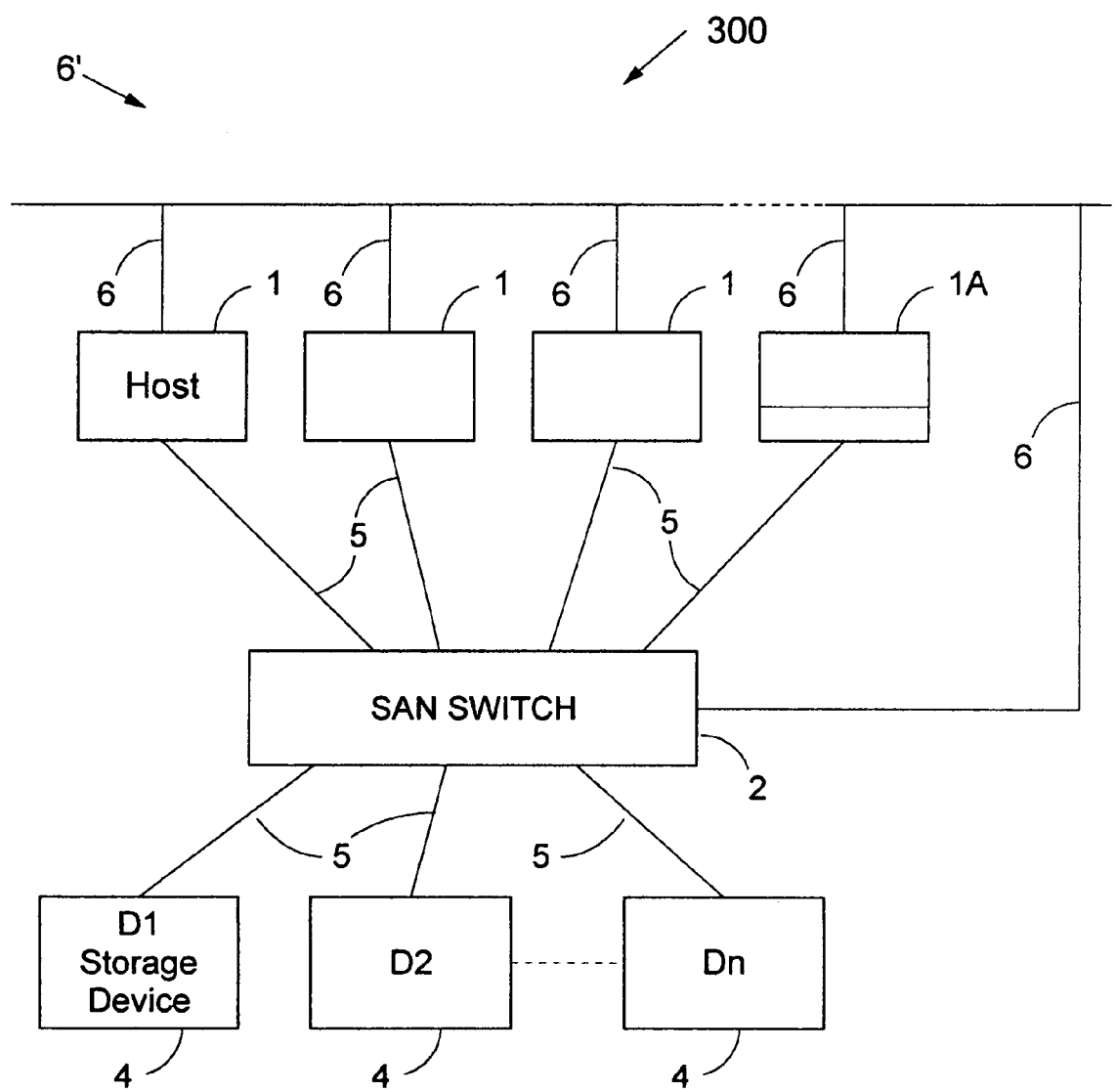
FIG. 13 presents a further embodiment of the SAN security depicted in FIG. 2, and FIG. 14 exemplifies still another embodiment of the SAN security of FIG. 2.
Figure 14:
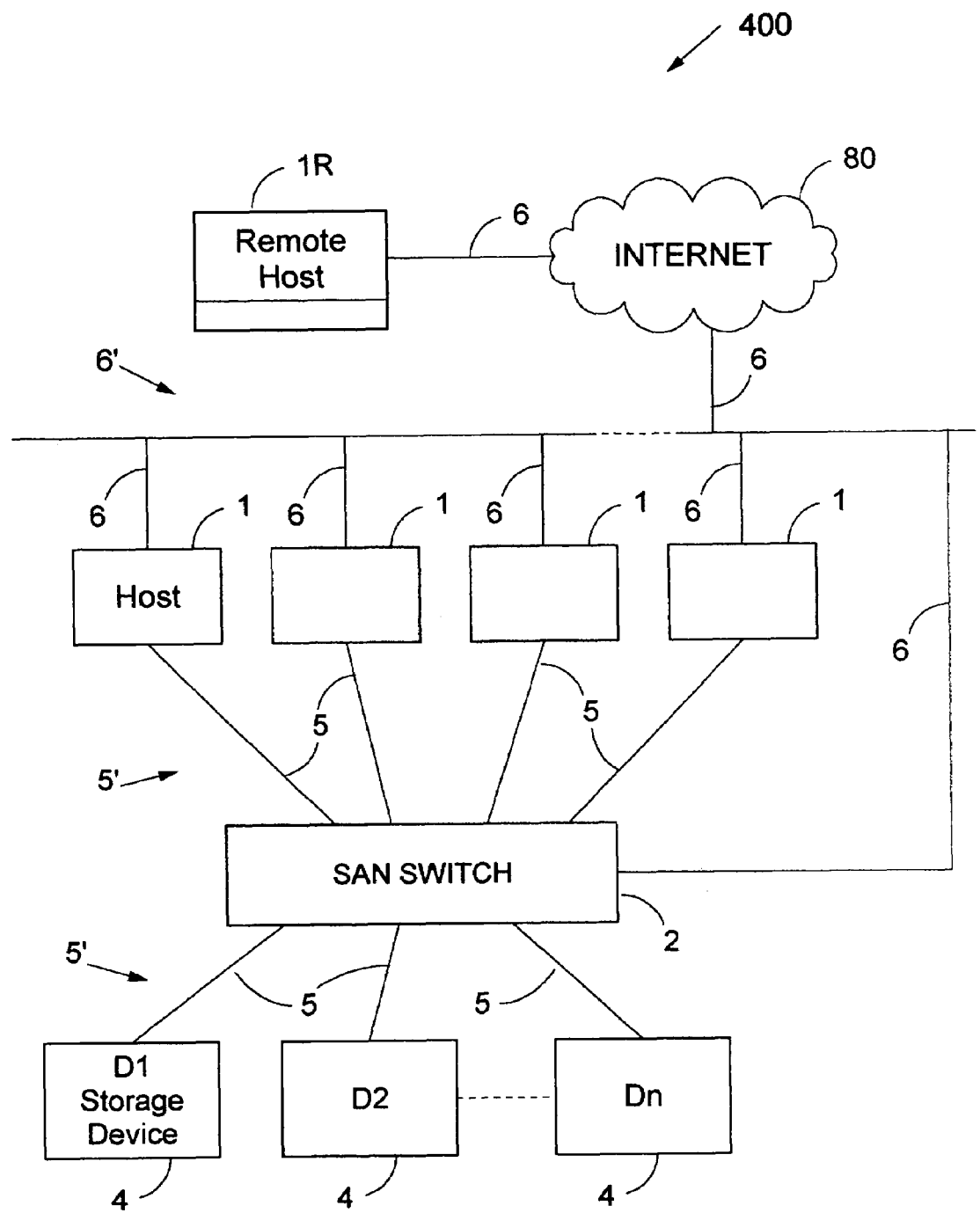

Additional embodiments of the security and booting procedure are shown in FIGS. 12 to 14.

In embodiment 200, in FIG. 12, the SAN Firewall 3 is integrated with the SAN Switch 2 to form a new SAN Switch 2A. For the sake of simplicity, the array of users 7 and the SA workstation 8 are not shown in FIG. 12. The integration configurations may span possibly only from the mere packaging of both the SAN Switch 2 and the SAN Firewall 3 into the same housing, up to the hardware and software integration of both, with many intermediate degrees of integration inbetween. The new SAN Switch 2A operates and functions as each one of both the SAN Switch 2 and of the SAN Firewall 3 which it replaces. The linking to the network, is almost the same as with embodiment 100: the connection linking both former San Switch 2 and SAN Firewall 3 is now internal to the SAN Switch 2A. Two users network links 6, or only a single users network links 6 as shown in FIG. 12, are/is coupled to the SAN Switch 2A according to the level of integration of this last one. The new embodiment 200 is transparent to the SA.

A further embodiment 300 is illustrated in FIG. 13, where the functions of the SAN Firewall 3 are implemented as a software computer program SFW 300, not shown in FIG. 13, running on a chosen host 1A. For the sake of simplicity, the array of users 7 and the SA workstation 8 are not shown in FIG. 13. The SAN Switch 2 of the embodiment 100 is retained, in coupling over a users network link 6 with the SA workstation 8, to operate as with embodiment 100. For the sake of redundancy, a second computer program SFW 300, (not shown in FIG. 13) is installed on any other host 1. Embodiment 300 is transparent to the SA and operates together with the SCP's Firewall Agent running in the hosts 1 as well as in the chosen host 1A.

Still another embodiment 400 is depicted in FIG. 14 where the SCP's Firewall Software functions of the SAN Firewall 3 are implemented as a software computer program SFW 400, not shown in FIG. 14, installed in a remote host 1R. The host 1R is coupled to the array of hosts 1 by a user network link 6 via another network, such as any global communication network 80 or the Internet for example. The zoning commands reach the SAN Switch 2 over the storage links 5, as for the embodiment 400, and/or by a users network link 6 also coupled to the SAN Switch 2.

In contrast with the embodiments 200 and 300, the remote host 1R resides outside the SAN. The software computer program SFM 400 is possibly the same or similar to the SFM 300 used in embodiment 300, but may require adaptations related to network communication requirements.

The embodiments 100 to 400 emphasize the many possibilities of implementation of the security and booting of a SAN as a combination of hardware and software running on processors of various kinds and in various locations. Furthermore, the security and/or booting is also easily implemented as dedicate hardware, or firmware, or software for operation on various processors or hosts 1. However, the SCP always retains two separate portions, namely the Firewall Agent and the Firewall Software.

SAN Booting

It is appreciated that the binary zoning method described above provides advantageous applications beyond security applications. For example, it is well known that on boot-up, each host 1 signals its active presence by emitting a notification message in the form of a communication on the storage network. Consequently, all the hosts on the network begin a physical device presence updating procedure, causing perturbations to the boot process due to the registration of the newly booted-up hosts with all the other hosts. This is why the prior art current practice in force is to boot each host separately by appropriate labor-intensive manual. Besides being tedious and time consuming, this process is prone to mistakes and connection errors. Therefore, the binary zoning provided by the security procedures of the SCP, whereby all the hosts 1 are initially isolated, automatizes the booting of SAN networks and is especially appreciated, and not only in the case large SAN installations with a multiplicity of hosts. Furthermore, the same advantage is beneficial when a host 1 is coupled to an operating SAN and booted up: since that host 1 encounters first a "dead-end" or default zone, and once operative, is coupled to a work zone, no perturbations are propagated.

Evidently, the SAN booting method is inherent to the SAN security method and is actually a SAN security and booting method. On boot-up, as for example by FIG. 2, each host 1 is isolated by the SAN Switch 2 in a default zone, as explained before. When indication is received that a host 1 is operative, that host is coupled to storage devices 4 in a work zone, as by the meta zoning instructions entered at the SA workstation 8. A booting implementation does not require any security procedure but only checks the operative status of the hosts 1. Here too, the SAN Switch 2 is burnt-in to always reside in the default zoning on start-up. A port from which a host 1 is uncoupled also immediately returns to a default zone. In parallel, when coupled to a SAN Switch port, a host 1 will always meet a default zone.

The booting of a SAN does not necessarily require a SAN Firewall 3. It is sufficient to keep the hosts 1 in isolation on boot-up, and after operation is detected, either by the SA or by any set-up added to the SAN Switch 2, to have the SA manually couple the physical devices in zones. To this end, it is sufficient to burn-in default zones, each default zone isolating a single port of the SAN Switch 2, since there is no SAN Firewall in this implementation. On boot-up, each host 1 meets a default zone. After detection that the host 1 isolated at a specific port is operative, that port is zoned. Although less automatic, this scheme is easily implemented.

It is possible to explain the binary zoning security method implemented by the SCP as operating with a SAN Switch residing in either the closed ("OFF") state representing default zoning, or in the operative ("ON") state, which is the work zoning. The verification procedures applied to the physical devices when the switch is "OFF", and zoning is performed, after verification and legitimation of the physical devices in the "ON" state. This binary approach permits to implement SAN verification methods in a wide spectrum of combinations of hardware, software, and firmware.

It will be appreciated by persons skilled in the art, that the present invention is not limited to what has been particularly shown and described hereinabove. For example, the operation of the SCP is possibly distributed over a range spanning from a single processor to many processors. Another option is to take advantage of interconnected SANs for mutual support, redundancy and security services, thereby profiting from various connection and linking schemes. Furthermore, as a spin-off, the binary zoning approach may be used for not only the booting of arrays of hosts, but also for other purposes. Rather, the scope of the present invention is defined by the appended claims and includes both combinations and sub-combinations of the various features described hereinabove as well as variations and modifications thereof which would occur to persons skilled in the art upon reading the foregoing description.

The invention claimed is:

1. A method for implementing security and booting of a Storage Area Network, SAN, the SAN including:

physical devices having a first array of hosts and a second array of storage devices, a storage network with network links, a users network with user network links, and a SAN Switch coupled intermediate the first array of hosts and the second array of storage devices and to each physical device via network links and to the users network via a users network link, the SAN Switch routing I/O commands to the physical devices and being configured for accepting zoning commands to define zones for communication between at least one host and at least one storage device, the San Switch comprising a plurality of ports for coupling each one of the physical devices to at least one port out of the plurality of ports by at least one network link, the method comprising the steps of:

coupling a SAN Firewall by the storage network link to a SAN-Firewall-port (sf) accommodated in the SAN Switch and coupled by the users network link to the users network, and configuring the SAN Firewall to operate an encrypted authentication procedure and to automatically program the SAN Switch into zones, with each zone residing first in default zoning out of a binary zoning comprising:

in default zoning, at least one default zone counting only two ports, with a first SAN-Firewall-port (sf) coupled to the SAN Firewall and connected to a second device port coupled to and isolating a physical device of the physical devices, the SAN Firewall operating an encrypted authentication procedure authenticating each host out of the array of hosts and at least one security verification procedure on the isolated physical device prior to permitting work zone coupling, and in work zoning thereafter, at least one working zone coupling at least three ports, with a single SAN-Firewall-port (sf), and at least two ports coupling only authenticated hosts and security verified physical devices counting at least one host port, and at least one storage device port.

2. The method according to claim 1, further comprising the steps of:

running, in default zoning, of the encrypted authentication and security procedure and thereafter, creating, in work zoning, of at least one work zone comprising at least one authenticated legitimate host and at least one legitimate storage device.

3. The method according to claim 1, wherein running the security procedure further comprises the steps of:

running an authentication procedure for presence and legitimacy verification of each one host out of the first array, and running an identification procedure for presence and legitimacy verification of each one storage device out of the second array.

4. The method according to claim 1, further comprising the steps of:

continuously running the security verification procedure for detecting the presence and for authentication legitimacy verification of the physical devices actually coupled in operation with the SAN, and rezoning in real time the at least one work zone according to configuration changes associated with continuously running the security procedure.

5. The method according to claim 3, wherein:

a host comprises at least one Host Bus Adaptor, HBA, which is identified by a first World Wide Number, and, a storage device comprises at least one Logical Unit, and identified by a second WWN and by at least one Logical Unit Number, the method further comprising the steps of:

authenticating each one host out of the first array independently of the first WWN, and identifying each one storage device out of the second array by the second WWN and by the at least one LUN.

6. The method according to claim 1, further comprising the steps of:

coupling a System Administration (SA) workstation to the users network and to the SAN Switch, configuring the SA workstation for managing, securing and booting the SAN, entering meta-zoning instructions via the SA workstation, the meta-zoning instructions defining programming commands for deriving default zoning and working zoning, dynamically controlling the binary zoning of the SAN Switch by the meta-zoning instructions, and automatically programming the SAN Switch, according to the meta-zoning instructions, into default zones and work zones.

7. The method according to claim 1, further comprising:

disposing at least one HBA in each one host out of the first array, said the metazoning instructions comprising instructions for zoning in a working zone of the at least one HBA pertaining to an authenticated legitimate host with at least one legitimate storage device.

8. The method according to claim 1, further comprising the step of:
burning-in the default zones in the SAN Switch, for automatically returning to and always start operation in default zoning, wherein the physical devices are mutually isolated.

9. The method according to claim 1, further comprising:
coupling each one physical device to at least one port out of the plurality of ports of the SAN Switch, each of said ports having a port identity, the security procedure further comprising the steps of:
verifying the authenticity and legitimacy of each one of the physical devices independently of the port identity of the at least one port to which one physical device is coupled, and
immediately returning the at least one port from which a physical device is decoupled, to a default zone.

10. The method according to claim 1, further comprising the step of configuring the storage network as a Fibre Channel network.

11. The method according to claim 10, further comprising the steps of:
running the boot procedure and thereafter,
creating, in work zoning, of at least one work zone comprising at least one operative host and at least one authenticated operative storage device.

12. The method according to claim 1, further comprising functionally integrating the SAN Firewall and the SAN Switch to form a single unit package.

13. The method according to claim 1, further comprising operating the SAN Firewall on a host selected from the first array, or on a remote host coupled the SAN, or on a remote host coupled to the SAN Switch via a network link coupled to a global communication network.

14. A system for operating security and booting of a Storage Area Network, SAN, including:
physical devices comprising a first array of hosts and a second array of storage devices,
a storage network with storage network links,
a users network with user network links, and
a SAN Switch coupled intermediate the first array of hosts and the second array of storage devices and to each physical device via network links, and coupled to the users network via the users network link, the SAN Switch routing I/O commands to the physical devices and being configured for accepting zoning commands defining zones for communication between at least one host and at least one storage device, the SAN Switch comprising a plurality of ports for coupling each one of the physical devices to at least one port out of the plurality of ports by at least one network link,
the system comprising:
a SAN Firewall coupled by the storage network link to a SAN-Firewall-port (sf) accommodated in the San Switch and coupled by the user network link to the users network, the SAN Firewall being configured to operate an encrypted authentication procedure and to automatically program the SAN Switch into zones, with each zone residing first in default zoning out of a binary zoning comprising:
in default zoning, at least one default zone counting only two ports, with a first SAN-Firewall-port coupled to the SAN Firewall and connected to a second deviceport coupled to and isolating a physical device of the physical devices, the SAN Firewall operating an encrypted authentication procedure authenticating each host out of the array of hosts and operating at least one security verification procedure on the isolated physical device prior to permitting work zone coupling, and
in work zoning thereafter, at least one working zone coupling at least three ports, with a single SAN-Firewall-port (sf), and at least two ports coupling only authenticated hosts and security verified physical devices counting at least one host port, and at least one storage device port.

15. The system according to claim 10, wherein:
the SAN Firewall is operatively associated with the physical devices to operate the at least one security authentication and booting procedure upon start of the SAN, in default zoning, and
the physical devices being isolated each in a default zone if they fail the at least one security authentication and booting procedure.

16. The system according to claim 14, wherein the SAN Firewall is operatively associated with the physical devices for carrying out a security procedure for securing the SAN, whereby the security procedure comprises verifying each one host out of the first array for authenticity and each one storage device out of the second array for identity.

17. The system according to claim 14, wherein the SAN Switch has default zones being burnt-in therein to always start operation in default zoning.

18. The system according to claim 14, wherein:
port of the SAN Switch from which a physical device is decoupled, is adapted to immediately return to a default zone, and
a physical device which is coupled to a port of the SAN Switch, is adapted to always couple to a default zone.

19. The system according to claim 14, further comprising:
a third array of user workstations coupled to the user network and comprising a System Administrator (SA) workstation coupled to the user network and to the SAN Firewall, the SA workstation being configured for managing, securing and booting the SAN wherein:
meta-zoning instructions, entered at the SA workstation are received at the SAN Firewall where programming commands are derived automatically to zone the SAN Switch in working zones, and
said meta-zoning instructions being adapted to dynamically control said binary zoning.

20. The system according to claim 14, wherein:
a host comprises at least one Host Bus Adapter (HBA) which is identified by a first World Wide Number (WWN), and
a storage device comprises at least one Logical Unit (LU) identified by a second WWN and by at least one Local Unit Number (LUN),
the SAN Firewall being operatively associated with each one host out of the first array for authentication thereof independent of the first WWN, said SAN Firewall being operatively associated with each one storage device out of the second array for identification thereof by the second WWN and by the at least one LUN.

21. The system according to claim 14, wherein each one host out of the first array has at least one HBA, the meta-zoning instructions being adapted to zone in a work zone of any one HBA pertaining to an authenticated legitimate host with at least one legitimate storage device.

22. The system according to claim 14, wherein:
each port out of the plurality of ports of the SAN Switch has a port identity,
each one physical device is coupled to at least one port out of the plurality of ports, the SAN Firewall being operatively associated with each one of the physical devices for verifying the authenticity and legitimacy of each one of the physical devices independent of the port identity of the at least one port to which one physical device is coupled.

23. The system according to claim 14, wherein the SAN Firewall is operatively associated with one each Host out of the first array to verify booting thereof in said at least one security and booting procedure, said SAN Firewall being further operatively associated with each one storage device out of the second array, to verify operation thereof in said security authentication and booting procedure, thereby simultaneously booting the first array of hosts in mutual isolation.

24. The system according to claim 14, wherein:
the SAN Firewall and the SAN Switch are functionally integrated, to form a single unit package.

25. The system according to claim 14, wherein the SAN Firewall functions are operated on a host selected from the first array, or on a remote host coupled to the SAN Switch, or on a remote host coupled to the SAN Switch via a network link coupled to a global communication network.

26. The system according to claim 14, wherein the storage network is a Fibre Channel network.

27. A Security Computer Program (SCP) resident on computer storage media for implementing security and booting of a Storage Area Network (SAN), the computer program being arranged to perform the method steps of claim 1.

28. A Security Computer Program resident on computer storage media for implementing security and booting of a Storage Area Network (SAN), the computer program being arranged to perform the method steps of claim 2.

29. A Security Computer Program resident on computer storage media for implementing security and booting of a Storage Area Network (SAN), the computer program being arranged to perform the method steps of claim 3.

30. A Security Computer Program resident on computer storage media for implementing security and booting of a Storage Area Network (SAN), the computer program being arranged to perform the method steps of claim 4.

31. A Security Computer Program resident on computer storage media for implementing security and booting of a Storage Area Network (SAN), the computer program being arranged to perform the method steps of claim 5.

32. A Security Computer Program resident on computer storage media for implementing security and booting of a Storage Area Network (SAN), the computer program being arranged to perform the method steps of claim 6.

33. A Security Computer Program resident on computer storage media for implementing security and booting of a Storage Area Network (SAN), the computer program being arranged to perform the method steps of claim 10.

34. The method according to claim 3, further comprising the steps of:
continuously running the security procedure for detection of presence and authenticity verification of the physical devices actually coupled in operation with the SAN, and
rezoning in real time the at least one work zone according to configuration changes associated with running the security procedure continuously.

* * * * *